United States Patent
Zhang et al.

(10) Patent No.: US 12,457,518 B2
(45) Date of Patent: Oct. 28, 2025

(54) COMMUNICATION METHOD AND APPARATUS

(71) Applicant: Huawei Technologies Co., Ltd., Shenzhen (CN)

(72) Inventors: Lili Zhang, Beijing (CN); Xizeng Dai, Beijing (CN); Jianghua Liu, Beijing (CN); Liangliang Zhang, Beijing (CN); Shulan Feng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 382 days.

(21) Appl. No.: 18/308,849

(22) Filed: Apr. 28, 2023

(65) Prior Publication Data
US 2023/0269618 A1   Aug. 24, 2023

Related U.S. Application Data

(63) Continuation of application No. PCT/CN2020/126868, filed on Nov. 5, 2020.

(51) Int. Cl.
*H04B 17/309* (2015.01)
*H04L 5/00* (2006.01)
*H04W 24/10* (2009.01)
*H04W 72/542* (2023.01)

(52) U.S. Cl.
CPC .......... *H04W 24/10* (2013.01); *H04B 17/309* (2015.01); *H04L 5/0051* (2013.01)

(58) Field of Classification Search
None
See application file for complete search history.

(56) References Cited

U.S. PATENT DOCUMENTS

| | | | |
|---|---|---|---|
| 11,405,814 B2* | 8/2022 | Lee | H04W 52/0229 |
| 11,936,438 B2* | 3/2024 | Niu | H04B 7/0695 |
| 2016/0119915 A1 | 4/2016 | Simonsson et al. | |
| 2017/0093508 A1* | 3/2017 | Martin | H04W 16/14 |
| 2019/0335477 A1* | 10/2019 | Nam | H04W 72/542 |
| 2020/0245374 A1* | 7/2020 | Tang | H04L 5/0094 |
| 2021/0314055 A1* | 10/2021 | Meshkati | H04B 7/0617 |
| 2021/0352741 A1* | 11/2021 | Mo | H04W 74/0866 |
| 2023/0143060 A1* | 5/2023 | Ramachandra | H04W 24/10 370/252 |
| 2023/0217280 A1* | 7/2023 | Wallentin | H04W 52/0229 370/252 |

FOREIGN PATENT DOCUMENTS

| | | |
|---|---|---|
| CN | 111200853 A | 5/2020 |
| WO | 2017193389 A1 | 11/2017 |

* cited by examiner

*Primary Examiner* — Duc T Duong
(74) *Attorney, Agent, or Firm* — Slater Matsil, LLP

(57) ABSTRACT

A communication method and apparatus are provided. The method includes: receiving configuration information from a network device, where the configuration information indicates an occasion and/or a period for sending a measurement signal on a second uplink carrier; obtaining signal quality or signal strength on a downlink carrier associated with a first uplink carrier, or signal quality or signal strength on a downlink resource on a first uplink carrier; and when a first condition is met, sending the measurement signal on the second uplink carrier by occupying the occasion and/or the period; or when a first condition is not met, determining not to send the measurement signal on the second uplink carrier by occupying the occasion and/or the period.

18 Claims, 14 Drawing Sheets

COMMUNICATION METHOD AND APPARATUS

CROSS-REFERENCE TO RELATED APPLICATIONS

This application is a continuation of International Application No. PCT/CN2020/126868, filed on Nov. 5, 2020, the disclosure of which is hereby incorporated by reference in its entirety.

TECHNICAL FIELD

This application relates to the field of wireless communication technologies, and in particular, to a communication method and apparatus.

BACKGROUND

In a mobile communication system such as a new radio (NR) system, a terminal device may perform uplink transmission on a normal uplink (NUL) carrier (for example, a 2.6 GHz frequency band). In addition, when power of uplink transmission of the terminal device is limited, and received signal strength of an uplink transmitted signal when the uplink transmitted signal arrives at a base station may be insufficient to ensure coverage performance of the uplink transmitted signal, the terminal device may perform uplink transmission on a carrier on a low frequency band in a long term evolution (LTE) system. The carrier on the frequency band is referred to as a supplementary uplink (SUL) carrier. Further, to provide more sufficient uplink resources, it is considered that a plurality of uplink carriers are allocated to the terminal device on a high frequency spectrum (for example, a 4.9 GHz frequency band), so that a radio spectrum resource with larger bandwidth can be allocated to the terminal device, to improve a throughput.

Before performing uplink transmission, the terminal device needs to send a sounding reference signal (SRS) to the base station, so that the base station measures uplink channel quality based on the SRS. In conclusion, in addition to the NUL and the SUL carrier, the terminal device needs to send the SRS on the plurality of uplink carriers corresponding to 4.9 GHz. When the terminal device sends the SRS on a plurality of carriers in turn, a radio frequency channel needs to be adjusted. Consequently, data transmission is interrupted. Longer duration in which data transmission is interrupted exerts greater impact on system performance. Therefore, duration in which data transmission is interrupted due to sending of the SRS needs to be reduced.

SUMMARY

This application aims to provide a communication method and apparatus, to resolve a problem of how to reduce duration in which data transmission is interrupted.

According to a first aspect, this application provides a communication method. The method is applicable to a scenario in which a network device configures at least one supplementary uplink carrier for a terminal device. The method is performed by the terminal device or a module of the terminal device. Herein, an example in which the terminal device is an execution body is used for description. The method includes: receiving configuration information from the network device, where the configuration information indicates an occasion and/or a period for sending a measurement signal on a second uplink carrier; obtaining signal quality or signal strength on a downlink carrier associated with a first uplink carrier, or signal quality or signal strength on a downlink resource on a first uplink carrier; and when a first condition is met, sending the measurement signal on the second uplink carrier by occupying the occasion and/or the period; or when a first condition is not met, determining not to send the measurement signal on the second uplink carrier by occupying the occasion and/or the period. The first condition includes: the signal quality or the signal strength is greater than or equal to a first threshold.

According to the method, when the network device configures that the terminal device sends the measurement signal on the second uplink carrier, the terminal device determines whether the first condition is met, and the terminal device sends the measurement signal on the configured occasion or in the configured period only when the first condition is met. When the first condition is not met, the terminal device may not send the measurement signal, to reduce a quantity of times of sending the measurement signal, and reduce a quantity of times of interrupting uplink transmission of the terminal device.

In a possible implementation of the first aspect, the method includes: sending feedback information to the network device. The feedback information indicates an occasion and/or a period that are/is not used to send the measurement signal.

In a possible implementation of the first aspect, the second uplink carrier is a supplementary uplink carrier of the first uplink carrier.

In a possible implementation of the first aspect, the measurement signal is used to determine whether the second uplink carrier is used to send information or whether the second uplink carrier is capable of being used to send information, or the measurement signal is used to determine a carrier that is used to send information or that is capable of being used to send information in the second uplink carrier.

In a possible implementation of the first aspect, the first condition further includes: an amount of to-be-sent data is greater than or equal to a second threshold.

According to a second aspect, this application provides a communication method. The method is applicable to a scenario in which a network device configures at least one supplementary uplink carrier for a terminal device. The method is performed by the network device or a module of the network device. Herein, an example in which the network device is an execution body is used for description. The method includes: sending configuration information to the terminal device, where the configuration information indicates an occasion and/or a period for sending a measurement signal on a second uplink carrier; and receiving the measurement signal on the occasion and/or in the period on the second uplink carrier when a first condition is met. The first condition includes: signal quality or signal strength on a downlink carrier associated with a first uplink carrier is greater than or equal to a first threshold, or signal quality or signal strength on a downlink resource on a first uplink carrier is greater than or equal to a first threshold.

In a possible implementation of the second aspect, the method includes: receiving feedback information from the terminal device. The feedback information indicates an occasion and/or a period that are/is not used to send the measurement signal.

In a possible implementation of the second aspect, the second uplink carrier is a supplementary uplink carrier of the first uplink carrier.

In a possible implementation of the second aspect, the measurement signal is used to determine whether the second uplink carrier is used to send information or whether the second uplink carrier is capable of being used to send information, or the measurement signal is used to determine a carrier that is used to send information or that is capable of being used to send information in the second uplink carrier.

According to a third aspect, this application provides a communication method. The method is applicable to a scenario in which a network device configures at least one supplementary uplink carrier for a terminal device. The method is performed by the terminal device or a module of the terminal device. Herein, an example in which the terminal device is an execution body is used for description. The method includes: sending a scheduling request to the network device on a first resource or a second resource on a first uplink carrier, where the scheduling request is used to request the network device to send scheduling information; and receiving first scheduling information from the network device when the scheduling request is sent on the first resource, where the first scheduling information indicates the terminal device to send a measurement signal on a second uplink carrier; or receiving second scheduling information from the network device when the scheduling request is sent on the second resource, where the second scheduling information indicates, to a terminal device, a resource used to send data.

According to the method, when sending the measurement signal, based on a configuration provided by the network device, the terminal device sends the scheduling request on the first resource when a trigger condition is met, so that the network device can trigger, before determining an amount of data that needs to be transmitted by the terminal device and before learning of RSRP of the terminal device, the terminal device to send the measurement signal, to activate a carrier for the terminal device based on the measurement signal, and meet an uplink carrier capacity expansion requirement of the terminal device.

In a possible implementation of the third aspect, the method includes: obtaining signal quality or signal strength on a downlink carrier associated with a first uplink carrier, or signal quality or signal strength on a downlink resource on a first uplink carrier. The sending a scheduling request to the network device on a first resource or a second resource on a first uplink carrier includes: sending the scheduling request to the network device on the first resource on the first uplink carrier when a first condition is met, where the first condition includes: the signal quality or the signal strength is greater than or equal to a first threshold; or sending the scheduling request to the network device on the second resource on the first uplink carrier when a first condition is not met.

In a possible implementation of the third aspect, the first condition further includes: an amount of to-be-sent data is greater than or equal to a second threshold.

In a possible implementation of the third aspect, the second uplink carrier is a supplementary uplink carrier of the first uplink carrier.

In a possible implementation of the third aspect, the first scheduling information further indicates, to the terminal device, the resource used to send data.

According to a fourth aspect, this application provides a communication method. The method is applicable to a scenario in which a network device configures at least one supplementary uplink carrier for a terminal device. The method is performed by the network device or a module of the network device. Herein, an example in which the network device is an execution body is used for description. The method includes: receiving a scheduling request from the terminal device on a first uplink carrier, where the scheduling request is used to request scheduling information; and when the scheduling request is received on a first resource, sending first scheduling information to the terminal device, where the first scheduling information indicates the terminal device to send a measurement signal on a second uplink carrier; or when the scheduling request is received on a second resource, sending second scheduling information to the terminal device, where the second scheduling information indicates, to the terminal device, a resource used to send data.

In a possible implementation of the fourth aspect, the second uplink carrier is a supplementary uplink carrier of the first uplink carrier.

In a possible implementation of the fourth aspect, the first scheduling information further indicates, to the terminal device, the resource used to send data.

According to a fifth aspect, this application provides a communication method. The method is applicable to a scenario in which a network device configures at least one supplementary uplink carrier for a terminal device. The method is performed by the terminal device or a module of the terminal device. Herein, an example in which the terminal device is an execution body is used for description. The method includes: receiving first scheduling information, where the first scheduling information includes first information and second information, the first information indicates the terminal device to send a measurement signal on a second uplink carrier, and the second information indicates a resource used to send data on a first uplink carrier; and sending the measurement signal on the second uplink carrier.

According to the method, the network device reuses existing first scheduling information for scheduling an uplink resource, to indicate the terminal device to send the measurement signal on the second uplink carrier, so that instruction overheads are reduced, and overheads existing when the terminal device detects an instruction of the network device can be reduced.

Based on a configuration provided by the network device, the measurement signal is sent on a corresponding resource when a trigger condition is met. In this way, the network device can trigger the terminal device to aperiodically send the measurement signal, to activate a carrier for the terminal device based on the measurement signal. Therefore, an uplink carrier capacity expansion requirement of the terminal device is met.

In a possible implementation of the fifth aspect, the first scheduling information further includes third information, and the third information indicates the terminal device to send the measurement signal on the first uplink carrier.

In a possible implementation of the fifth aspect, the first information indicates the terminal device to send the measurement signal on the second uplink carrier, and the first information is indication information indicating whether to send the measurement signal on the second uplink carrier, or the first information is indication information indicating to send the measurement signal on the second uplink carrier.

In a possible implementation of the fifth aspect, a bit occupied by the first information and a bit occupied by the third information in the first scheduling information are jointly coded, or a bit occupied by the first information and a bit occupied by the third information in the first scheduling information are located in one field.

In a possible implementation of the fifth aspect, the first scheduling information further indicates one or more of the following:
an occasion and/or a period for sending the measurement signal on the first uplink carrier; and an occasion and/or a period for sending the measurement signal on the second uplink carrier.

In a possible implementation of the fifth aspect, the receiving first scheduling information includes: receiving the first scheduling information on a downlink carrier associated with the first uplink carrier or on a downlink resource on the first uplink carrier.

In a possible implementation of the fifth aspect, the second uplink carrier is a supplementary uplink carrier of the first uplink carrier.

According to a sixth aspect, this application provides a communication method. The method is applicable to a scenario in which a network device configures at least one supplementary uplink carrier for a terminal device. The method is performed by the network device or a module of the network device. Herein, an example in which the network device is an execution body is used for description. The method includes: sending first scheduling information, where the first scheduling information includes first information and second information, the first information indicates the terminal device to send a measurement signal on a second uplink carrier, and the second information indicates a resource used to send data on a first uplink carrier; and receiving the measurement signal on the second uplink carrier.

In a possible implementation of the sixth aspect, the first scheduling information further includes third information, and the third information indicates the terminal device to send the measurement signal on the first uplink carrier.

In a possible implementation of the sixth aspect, that the first information indicates the terminal device to send the measurement signal on the second uplink carrier means that, the first information is indication information indicating whether to send the measurement signal on the second uplink carrier, or the first information is indication information indicating to send the measurement signal on the second uplink carrier.

In a possible implementation of the sixth aspect, a bit occupied by the first information and a bit occupied by the third information in the first scheduling information are jointly coded, or a bit occupied by the first information and a bit occupied by the third information in the first scheduling information are located in one field.

In a possible implementation of the sixth aspect, the first scheduling information further indicates one or more of the following:
an occasion and/or a period for sending the measurement signal on the first uplink carrier; and an occasion and/or a period for sending the measurement signal on the second uplink carrier.

In a possible implementation of the sixth aspect, the sending first scheduling information includes: sending the first scheduling information on a downlink carrier associated with the first uplink carrier or on a downlink resource on the first uplink carrier.

In a possible implementation of the sixth aspect, the second uplink carrier is a supplementary uplink carrier of the first uplink carrier.

According to a seventh aspect, this application provides a communication method. The method is applicable to a scenario in which a network device configures at least one supplementary uplink carrier for a terminal device. The method is performed by the terminal device or a module of the terminal device. Herein, an example in which the terminal device is an execution body is used for description. The method includes: receiving a first instruction from the network device, where the first instruction indicates a second uplink carrier that is capable of being used to send information or that is used to send information in K second uplink carriers; and sending a measurement signal on L second uplink carriers, where the L second uplink carriers each are a second uplink carrier in the K second uplink carriers that is different from the second uplink carrier that is capable of being used to send information or that is used to send information, L is an integer less than or equal to K, and K is an integer greater than 0.

According to the method, after the second uplink carrier that is capable of being used to send information or that is used to send information is determined, the measurement signal is no longer sent on the carrier, to reduce a quantity of times of sending the measurement signal, and reduce a quantity of times of interrupting uplink transmission of the terminal device.

In a possible implementation of the seventh aspect, the method includes: receiving a second instruction from the network device. The second instruction indicates K occasions for sending the measurement signal on the K second uplink carriers.

In a possible implementation of the seventh aspect, the method includes: determining, based on the K occasions for sending the measurement signal on the K second uplink carriers, L occasions for sending the measurement signal on the L second uplink carriers.

In a possible implementation of the seventh aspect, the method includes: receiving a third instruction from the network device, where the third instruction indicates the L occasions for sending the measurement signal on the L second uplink carriers.

In a possible implementation of the seventh aspect, the L occasions each are an occasion corresponding to a second uplink carrier other than a second uplink carrier that is capable of being used to send information in the K occasions.

In a possible implementation of the seventh aspect, the L occasions are L occasions that first appear in time domain in the K occasions, or the L occasions are L occasions that last appear in time domain in the K occasions.

In a possible implementation of the seventh aspect, a sequence relationship between the L second uplink carriers on which the measurement signal is sent on the K occasions is the same as a sequence relationship between the L second uplink carriers on which the measurement signal is sent on the L occasions.

In a possible implementation of the seventh aspect, a sequence relationship between the L second uplink carriers on which the measurement signal is sent on the L occasions is the same as a sequence relationship between the K second uplink carriers on which the measurement signal is sent on the K occasions.

According to an eighth aspect, this application provides a communication method. The method is applicable to a scenario in which a network device configures at least one supplementary uplink carrier for a terminal device. The method is performed by the network device or a module of the network device. Herein, an example in which the network device is an execution body is used for description. The method includes: sending a first instruction to the terminal device, where the first instruction indicates a second uplink carrier that is capable of being used to send information or that is used to send information in K second uplink carriers; and receiving a measurement signal from the terminal device on L second uplink carriers, where the L second uplink carriers each are a second uplink carrier in the K second uplink carriers that is different from the second uplink carrier that is capable of being used to send information or that is used to send information, L is an integer less than or equal to K, and K is an integer greater than 0.

In a possible implementation of the eighth aspect, the method includes: sending a second instruction to the terminal device. The second instruction indicates K occasions for sending the measurement signal on the K second uplink carriers.

In a possible implementation of the eighth aspect, the method includes: determining, based on the K occasions for sending the measurement signal on the K second uplink carriers, L occasions for sending the measurement signal on the L second uplink carriers.

In a possible implementation of the eighth aspect, the method includes: sending a third instruction to the terminal device, where the third instruction indicates the L occasions for sending the measurement signal on the L second uplink carriers.

In a possible implementation of the eighth aspect, the L occasions each are an occasion corresponding to a second uplink carrier other than a second uplink carrier that is capable of being used to send information in the K occasions.

In a possible implementation of the eighth aspect, the L occasions are L occasions that first appear in time domain in the K occasions, or the L occasions are L occasions that last appear in time domain in the K occasions.

In a possible implementation of the eighth aspect, a sequence relationship between the L second uplink carriers on which the measurement signal is sent on the K occasions is the same as a sequence relationship between the L second uplink carriers on which the measurement signal is sent on the L occasions.

In a possible implementation of the eighth aspect, a sequence relationship between the L second uplink carriers on which the measurement signal is sent on the L occasions is the same as a sequence relationship between the K second uplink carriers on which the measurement signal is sent on the K occasions.

According to a ninth aspect, this application further provides a communication apparatus. The communication apparatus has a function of implementing any method according to the first aspect, the third aspect, the fifth aspect, or the seventh aspect. The communication apparatus may be implemented by hardware, or may be implemented by hardware by executing corresponding software. The hardware or the software includes one or more units or modules corresponding to the foregoing functions.

In a possible implementation, the communication apparatus includes a processor. The processor is configured to support the communication apparatus to perform a corresponding function of the terminal device in the foregoing methods. The communication apparatus may further include a memory. The memory may be coupled to the processor, and the memory stores program instructions and data that are necessary for the communication apparatus. Optionally, the communication apparatus further includes a communication interface, and the communication interface is configured to support communication between the communication apparatus and a device such as a network device.

In a possible implementation, the communication apparatus includes a corresponding functional module, configured to implement the steps in the foregoing methods. The function may be implemented by hardware, or may be implemented by hardware executing corresponding software. The hardware or software includes one or more modules corresponding to the foregoing functions.

In a possible implementation, a structure of the communication apparatus includes a processing unit and a communication unit. These units may perform corresponding functions in the foregoing method examples. For details, refer to the descriptions in the method according to the first aspect. Details are not described herein again.

According to a tenth aspect, this application further provides a communication apparatus. The communication apparatus has a function of implementing any method according to the second aspect, the fourth aspect, the sixth aspect, or the eighth aspect. The communication apparatus may be implemented by hardware, or may be implemented by hardware by executing corresponding software. The hardware or the software includes one or more units or modules corresponding to the foregoing functions.

In a possible implementation, the communication apparatus includes a processor, and the processor is configured to support the communication apparatus to perform a corresponding function of the network device in the foregoing methods. The communication apparatus may further include a memory. The memory may be coupled to the processor, and the memory stores program instructions and data that are necessary for the communication apparatus. Optionally, the communication apparatus further includes a communication interface, and the communication interface is configured to support communication between the communication apparatus and a device such as a terminal device.

In a possible implementation, the communication apparatus includes a corresponding functional module, configured to implement the steps in the foregoing methods. The function may be implemented by hardware, or may be implemented by hardware executing corresponding software. The hardware or software includes one or more modules corresponding to the foregoing functions.

In a possible implementation, a structure of the communication apparatus includes a processing unit and a communication unit. These units may perform corresponding functions in the foregoing method examples. For details, refer to the descriptions in the method according to the third aspect. Details are not described herein again.

According to an eleventh aspect, a communication apparatus is provided. The communication apparatus includes a processor and a communication interface. The communication interface is configured to: receive a signal from a communication apparatus other than the communication apparatus and transmit the signal to the processor, or send a signal from the processor to a communication apparatus other than the communication apparatus. The processor is configured to implement the method according to the first aspect, the third aspect, the fifth aspect, or the seventh aspect by using a logic circuit or by executing code instructions.

According to a twelfth aspect, a communication apparatus is provided. The communication apparatus includes a processor and a communication interface. The communication interface is configured to: receive a signal from a communication apparatus other than the communication apparatus and transmit the signal to the processor, or send a signal from the processor to a communication apparatus other than the communication apparatus. The processor is configured to implement the method according to the second aspect, the fourth aspect, the sixth aspect, or the eighth aspect by using a logic circuit or by executing code instructions.

According to a thirteenth aspect, a computer-readable storage medium is provided. The computer-readable storage medium stores a computer program or instructions, and when the computer program or the instructions are executed by a processor, the method in any one of the first aspect, the third aspect, the fifth aspect, and the seventh aspect, and any possible implementation of any aspect is implemented.

According to a fourteenth aspect, a computer program product including instructions is provided. When the instructions are run by a processor, the method in any one of the second aspect, the fourth aspect, the sixth aspect, and the eighth aspect, and any possible implementation of any aspect is implemented.

According to a fifteenth aspect, a chip system is provided. The chip system includes a processor, and may further include a memory, configured to implement the method in any one of the first aspect, the third aspect, the fifth aspect, and the seventh aspect, and any possible implementation of any aspect. The chip system may include a chip, or may include a chip and another discrete component.

According to a sixteenth aspect, a chip system is provided. The chip system includes a processor, and may further include a memory, configured to implement the method in any one of the second aspect, the fourth aspect, the sixth aspect, and the eighth aspect, and any possible implementation of any aspect. The chip system may include a chip, or may include a chip and another discrete component.

According to a seventeenth aspect, a communication system is provided. The system includes the apparatus (for example, a terminal device) in the first aspect, the third aspect, the fifth aspect, or the seventh aspect and the apparatus (for example, a network device) in the second aspect, the fourth aspect, the sixth aspect, or the eighth aspect.

DETAILED DESCRIPTION OF ILLUSTRATIVE EMBODIMENTS

The following further describes in detail embodiments of this application with reference to the accompanying drawings.

The technical solutions provided in this application may be applied to various communication systems such as a long term evolution (LTE) system and a new radio (NR) system. This is not limited herein.

Figure 1:
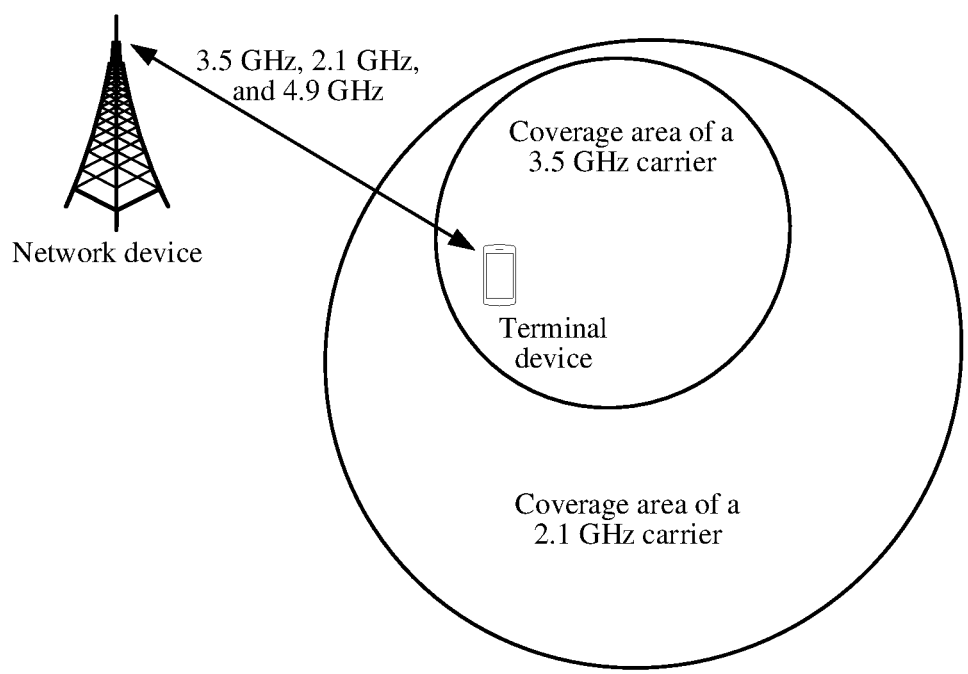
FIG. 1 is a schematic diagram of an architecture of a network to which an embodiment of this application is applicable.

FIG. 1 is a schematic diagram of an architecture of a network to which an embodiment of this application is applicable. In the network shown in FIG. 1, a network device may communicate with a terminal device on a plurality of carriers. For example, the network is a 5G network. A communication carrier between the network device and the terminal device includes a carrier on a main frequency band used for 5G. Optionally, the main frequency band may be a 3.5 GHz frequency band. When a frequency division duplex (FDD) mode is used, the carrier may be classified into an uplink carrier and a downlink carrier. Compared with another frequency band, the uplink carrier may also be referred to as a NUL carrier. When a time division duplex (TDD) mode is used, uplink and downlink multiplexing may be performed on the carrier in a time division manner. In other words, the carrier may include an uplink resource and a downlink resource.

In the 5G network, at least one SUL carrier may be further configured to ensure uplink coverage performance. In this embodiment of this application, the network device may select at least one carrier from a carrier on a low frequency band (for example, a frequency band such as a 700 MHz frequency band, a 1.8 GHz frequency band, or a 2.1 GHz frequency band) in an LTE system as a SUL carrier.

Further, in this embodiment of this application, the network device may alternatively operate on a carrier on a high frequency band. For example, the network device may operate on a 4.9 GHz carrier, a high-frequency carrier in an frequency range (FR) 1, or a carrier in an FR 2, so that more sufficient uplink resources can be provided.

With reference to FIG. 1, the terminal device may send a measurement signal on the uplink carrier, and the network device may determine, based on signal strength of the received measurement signal, whether to use the uplink carrier as an activated carrier or an operating carrier. Therefore, when the network device operates on a plurality of frequency bands, how the terminal device sends the measurement signal to reduce a quantity of times of sending the measurement signal and avoid exerting impact on uplink data transmission is an urgent problem to be resolved. Details are described below.

It should be noted that the terminal device may be a device that has a wireless transceiver function or a chip that may be disposed in any device, or may be referred to as user equipment (UE), an access terminal, a subscriber unit, a user station, a mobile station, a mobile console, a mobile device, a user terminal, a wireless communication device, or a user apparatus. The terminal device in this embodiment of this application may be a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in TeleMedicine, a wireless terminal in smart grid, or the like.

The network device may be a next generation NodeB (gNB) in an NR system, an evolved NodeB (eNB) in the LTE system, or the like. When the network device is a gNB, the network device may include a central unit (CU) and a distributed unit (DU).

In this application, the activated carrier may be understood as a carrier used for uplink data transmission or a carrier that is capable of being used for uplink data transmission.

It should be noted that the architecture of the network and a service scenario described in this embodiment of this application are intended to describe the technical solutions in embodiments of this application more clearly, and do not constitute a limitation on the technical solutions provided in embodiments of this application. A person of ordinary skill in the art may know that, with evolution of the architecture of the network and emergence of a new service scenario, the technical solutions provided in embodiments of this application are also applicable to a similar technical problem.

For ease of description, the following explains some terms in this application.

A measurement signal may be an SRS, a preamble, a demodulation reference signal (DMRS), a code division multiple access (CDMA) code, or any uplink signal. A specific implementation of the measurement signal is not limited in this application.

Signal quality includes but is not limited to one or more of reference signal received quality (RSRQ) or a signal to interference plus noise ratio (SINR).

Signal strength includes but is not limited to one or more of reference signal received power (RSRP) or a received signal strength indicator (RSSI).

A symbol may be an orthogonal frequency division multiplexing (OFDM) symbol, or may be another type of symbol, which is briefly referred to as a symbol below.

In this application, a first uplink carrier may be a carrier including an uplink resource. The first uplink carrier may further include a downlink resource. For example, compared with the downlink resource, the uplink resource is dominant. In other words, the first uplink carrier is an uplink (UL) dominant carrier. The first uplink carrier may alternatively be a carrier including only an uplink resource. In other words, the first uplink carrier is only used for uplink transmission. The first uplink carrier may also be referred to as a TDD carrier.

That the first uplink carrier includes the uplink resource and the downlink resource may be understood as that the first uplink carrier includes both a time unit of the downlink resource and a time unit of the uplink resource. The time unit includes at least one of a slot, a subframe, a symbol, or a mini-slot. For example, the first uplink carrier is a TDD carrier, and is a carrier for uplink and downlink multiplexing.

Optionally, in this application, the first uplink carrier includes only the uplink resource, or is only used for uplink transmission. In this case, the first uplink carrier is further associated with a first downlink carrier, and the first downlink carrier is used for downlink transmission. That the first uplink carrier has an association relationship with the first downlink carrier may mean that the first uplink carrier and the first downlink carrier are located in a same cell. The cell is configured by a network device. In other words, the first uplink carrier and the first downlink carrier belong to a same serving cell. For example, the first uplink carrier is an FDD carrier.

When the first uplink carrier includes the downlink resource, the network device may send configuration information, first scheduling information, or the like to a terminal device on the first uplink carrier. When the first uplink carrier includes the uplink resource, the terminal device may send a scheduling request, or the like to the network device on the first uplink carrier.

The network device may further configure at least one second uplink carrier. If the first uplink carrier is a carrier including an uplink resource, the at least one second uplink carrier may be a supplementary uplink carrier of the first uplink carrier. If the first uplink carrier is a carrier including only a downlink resource, the at least one second uplink carrier may be a supplementary uplink carrier of an uplink carrier associated with the first uplink carrier. That the at least one second uplink carrier may be a supplementary uplink carrier of the first uplink carrier may also be referred to as that the at least one second uplink carrier is a supplementary uplink carrier. That the at least one second uplink carrier may be a supplementary uplink carrier of the uplink carrier associated with the first uplink carrier may also be referred to as that the at least one second uplink carrier is a supplementary uplink carrier.

Optionally, a frequency of a frequency band on which the second uplink carrier is located is higher than a frequency of a frequency band on which the first uplink carrier is located. For example, the frequency of the frequency band on which the second uplink carrier is located is 4.9 GHz, and the frequency of the frequency band on which the first uplink carrier is located is 3.5 GHz.

In this application, the first uplink carrier and the second uplink carrier each may be one or more carriers. This is not limited.

In embodiments of this application, interaction between devices such as the terminal device and the network device is used as an example for description. A method provided in embodiments of this application may be further applicable to interaction between other execution bodies, for example, interaction between a chip or a module in the terminal device and a chip or a module in the network device. When the execution body is a chip or a module, reference is made to the descriptions in embodiments of this application. Details are not described herein again.

Embodiment 1

In Embodiment 1, when a network device configures that a terminal device periodically sends a measurement signal on at least one uplink carrier, the terminal device determines whether a trigger condition is met, and the terminal device sends the measurement signal on a configured occasion only when the trigger condition is met. When the trigger condition is not met, the terminal device may not send the measurement signal, to reduce a quantity of times of sending the measurement signal, and reduce a quantity of times of interrupting uplink transmission of the terminal device. Embodiment 1 may be applied to a scenario in which a measurement signal needs to be periodically sent, or may be applied to another scenario. This is not limited herein.

Figure 2:
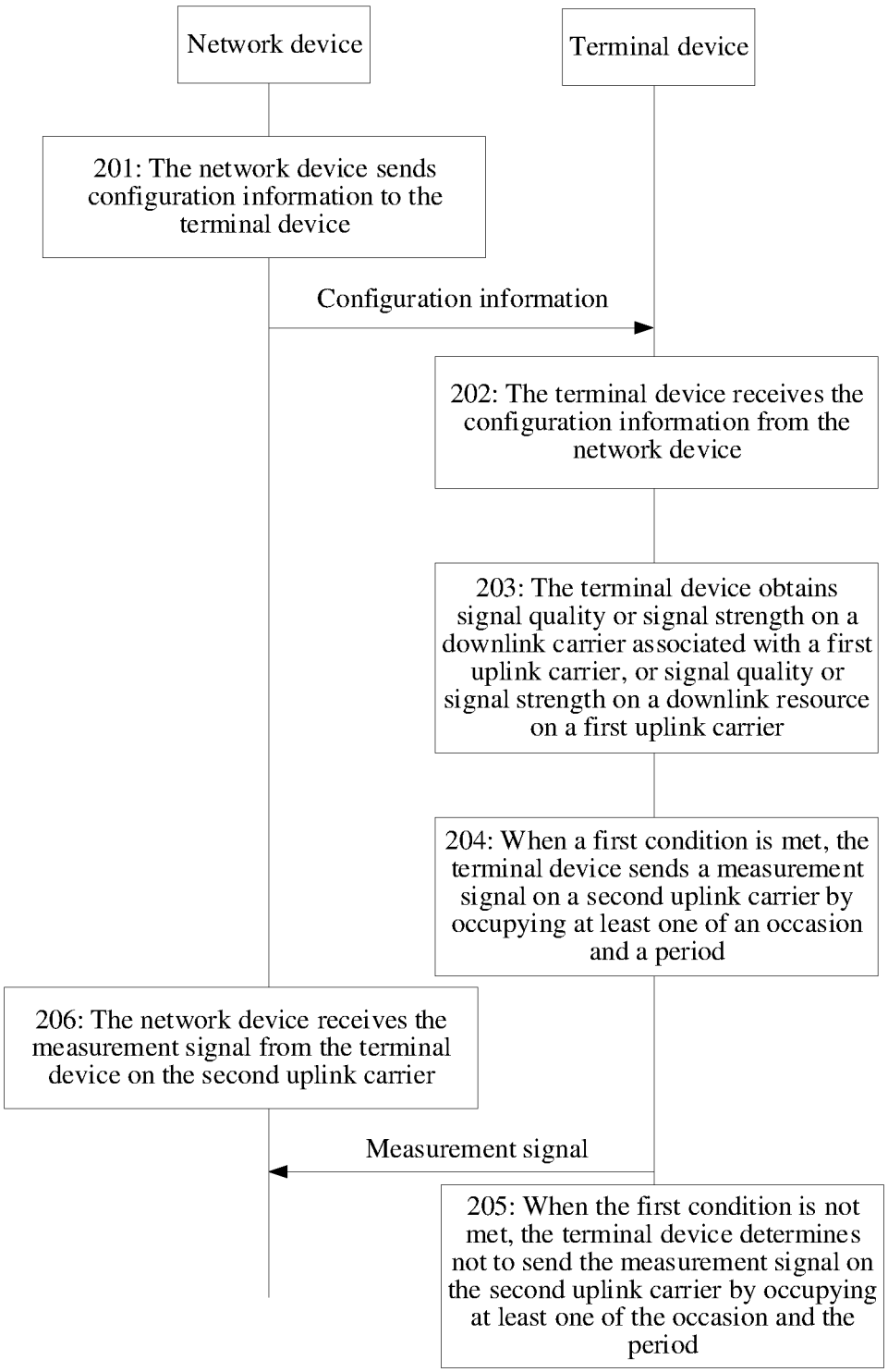
FIG. 2 is a schematic flowchart of a communication method according to an embodiment of this application.

With reference to the foregoing descriptions, FIG. 2 is a schematic flowchart of a communication method according to an embodiment of this application. Refer to FIG. 2. The method includes the following steps.

Step 201: A network device sends configuration information to a terminal device.

Optionally, the network device may send the configuration information on a first uplink carrier.

Optionally, in this embodiment, the first uplink carrier includes a downlink resource.

Optionally, the network device may alternatively send the configuration information on a downlink carrier. The downlink carrier may be a downlink carrier associated with the first uplink carrier, or may be another downlink carrier.

Step 202: The terminal device receives the configuration information from the network device.

The configuration information indicates at least one of an occasion and a period for sending the measurement signal on a second uplink carrier. The occasion for sending the measurement signal may be a time window or a time range for sending the measurement signal. The occasion may alternatively be at least one of information about an occupied slot or information about an occupied symbol. The occasion may alternatively be at least one of information about a slot or information about a symbol in a time window for sending the measurement signal. The information about a symbol may include at least one of a symbol location and a quantity of symbols, and the information about a slot may include at least one of a slot location and a slot offset.

The period indicated by the configuration information may include but is not limited to information such as duration of the period, a start location of the period, a quantity of periods, and an end location of the period.

In this embodiment of this application, the configuration information may further indicate one or more of the following:

a period for sending the measurement signal, where the period is, for example, 10 ms, and it indicates that duration of the period of the measurement signal is 10 ms; a quantity N of periods for sending the measurement signal, where N is an integer greater than 0, for example, N is equal to 5, and it indicates that the measurement signal needs to be sent in five periods; a quantity of times of repeated transmission of the measurement signal, where the quantity of times of repeated transmission may be a quantity of times that the measurement signal needs to be repeatedly transmitted; and a first pattern, where the first pattern indicates at least one of a carrier sequence and an occasion for sending the measurement signal on at least one second uplink carrier by the terminal device. A quantity of times of repeated transmission may be a quantity of times of continuous sending, for example, a quantity of symbols for continuously sending the measurement signal, or may be a quantity of times of repeated sending performed in the period for sending the measurement signal. For the quantity of times of repeated transmission, whether repeated transmission is performed in one period is not limited.

In a possible implementation, the configuration information may directly indicate the occasion. In another implementation, the configuration information may indirectly indicate the occasion. For example, the configuration information indicates a pattern, and the pattern includes the occasion for sending the measurement signal on the at least one second uplink carrier.

Figure 3:
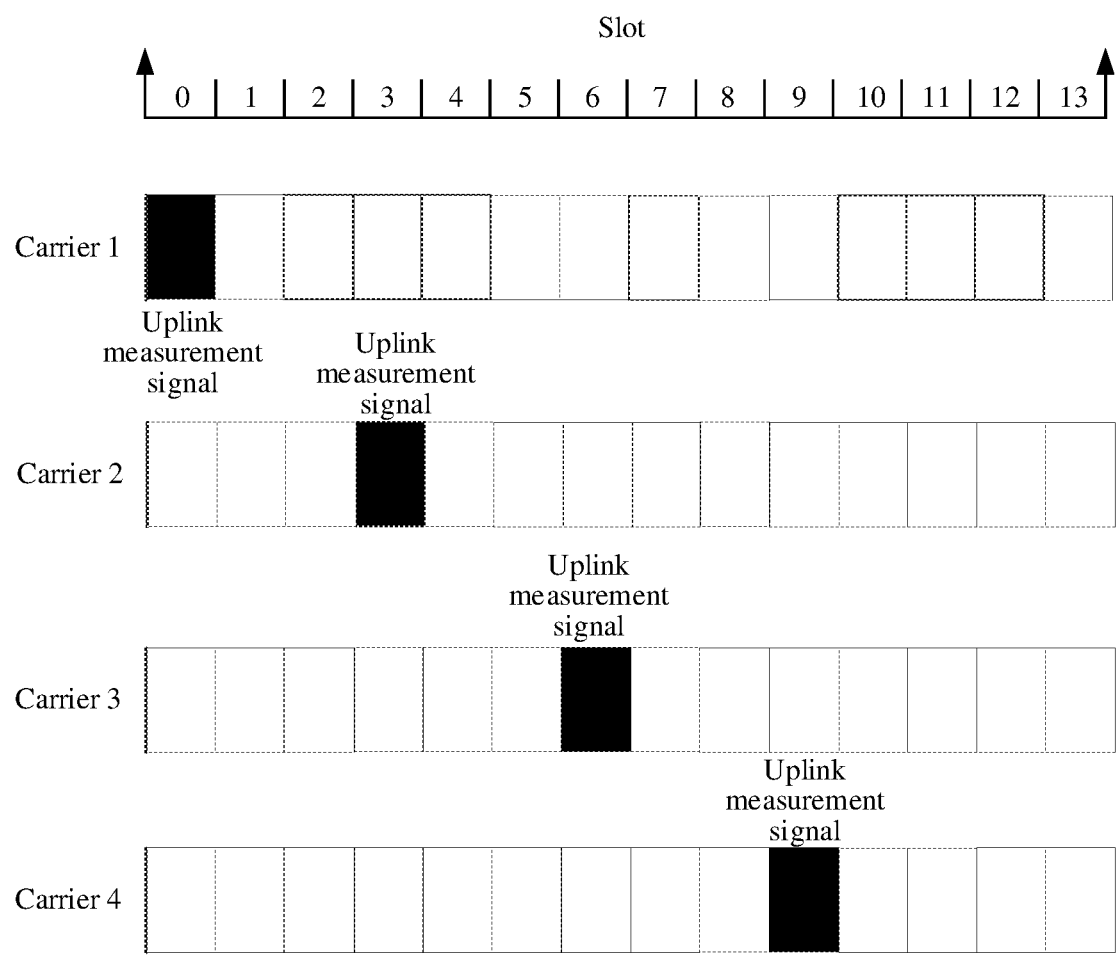
FIG. 3 is a schematic diagram of a pattern according to an embodiment of this application.

For example, FIG. 3 is a schematic diagram of a pattern. The pattern in FIG. 3 indicates occasions for sending the measurement signal on four carriers (a carrier 1 to a carrier 4), and specifically indicates a symbol location occupied to send the measurement signal on each carrier and a quantity.

In FIG. 3, an example in which one slot includes 14 symbols (which are respectively a symbol 0 to a symbol 13) is used for description. The terminal device needs to sequentially send the measurement signal on each carrier in a sequence of the carrier 1 to the carrier 4. The measurement signal occupies one symbol on each carrier, and separately occupied symbols are a symbol 0, a symbol 3, a symbol 6, and a symbol 9. Certainly, optionally, the measurement signal may alternatively occupy at least one symbol on each carrier. For example, the measurement signal may alternatively occupy a plurality of symbols on each carrier. In an example, the measurement signal occupies two symbols on each carrier, and separately occupied symbols are a symbol 0 and a symbol 1, a symbol 4 and a symbol 5, a symbol 8 and a symbol 9, and a symbol 12 and a symbol 13.

It should be noted that a symbol that is occupied by the measurement signal on at least one uplink carrier and that is indicated in one pattern belongs to one slot or at least one consecutive slot; or the first pattern is a slot offset or a set of slot offsets relative to the first downlink carrier; or the first pattern is a slot offset or a set of slot offsets the first uplink carrier.

In this embodiment of this application, the terminal device may store a plurality of patterns, and each pattern corresponds to one identifier. The network device may use the configuration information to carry an identifier of one pattern, to indicate a corresponding pattern to the terminal device.

In this embodiment of this application, the terminal device may alternatively obtain a plurality of patterns, and each pattern corresponds to one identifier. The network device may use the configuration information to carry an identifier of one pattern, to indicate a corresponding pattern to the terminal device. The plurality of patterns may be obtained from the network device, or may be preconfigured.

The foregoing is merely an example. The configuration information may further indicate other content. The other content is not listed one by one herein.

It should be noted that, in this embodiment of this application, the measurement signal is used to determine whether the second uplink carrier is used to send information or whether the second uplink carrier is capable of being used to send information, or the measurement signal is used to determine a carrier that is used to send information or that is capable of being used to send information in the second uplink carrier. A carrier that is capable of being used to send information may be referred to as an activated carrier. A carrier used to send information may be referred to as an operating carrier.

Step 203: The terminal device obtains signal quality or signal strength on the downlink carrier associated with the first uplink carrier, or signal quality or signal strength on the downlink resource on the first uplink carrier.

The terminal device may measure a signal on a first downlink carrier associated with the first uplink carrier or the downlink resource on the first uplink carrier, to obtain signal quality or signal strength. How the terminal device specifically performs measurement is not limited in this embodiment of this application.

It should be noted that, if the terminal device is configured to send the measurement signal in N periods, the terminal device may separately perform determining for each period or occasion, in other words, obtain signal quality or signal strength before each period or occasion; and determine, based on the obtained signal quality or signal strength, whether to send the measurement signal in the period or on the occasion. Alternatively, the terminal device may perform determining for a plurality of periods in the N periods, in other words, obtain signal quality or strength before the plurality of periods or a plurality of occasions; and determine, based on the signal quality or strength, whether to send the measurement signal in the plurality of periods or on the plurality of occasions. The terminal device may alternatively obtain signal quality or signal strength once at intervals, and perform determining for each period or occasion based on most recently obtained signal quality or signal strength.

Step 204: When a first condition is met, the terminal device sends the measurement signal on the second uplink carrier by occupying at least one of the occasion and the period.

That an uplink measurement signal is sent on the second uplink carrier by occupying the occasion and/or the period may be understood as that the uplink measurement signal is sent on the occasion and/or in the period on the second uplink carrier, or the uplink measurement signal is sent on the occasion and/or in the period by using the second uplink carrier. That the measurement signal is sent by occupying the occasion and/or the period may be understood as that the measurement signal is sent on the occasion and/or in the period.

It should be noted that, the network device may configure the at least one second uplink carrier, and the terminal device may send the measurement signal on the at least one second uplink carrier. The second uplink carrier may be a supplementary uplink carrier of the first uplink carrier.

The first condition includes: a measurement result of the signal strength is greater than or equal to a first threshold. Optionally, the first condition further includes: an amount of to-be-sent data of the terminal device is greater than or equal to a second threshold. The amount of to-be-sent data of the terminal device may be a data amount of data that needs to be sent in an uplink buffer of the terminal device. If the amount of to-be-sent data of the terminal device is greater than or equal to the second threshold, it may indicate that an uplink carrier currently configured by the network device for the terminal device cannot meet an uplink transmission requirement, and more uplink carriers need to be activated for the terminal device. For example, the amount of to-be-sent data of the terminal device may be a buffer status report (BSR).

The first threshold and the second threshold may be configured by the network device. For example, the network device configures the first threshold and the second threshold by using radio resource control (RRC) signaling. The first threshold and the second threshold may alternatively be determined in another manner. This is not limited in this embodiment of this application.

Step 205: When the first condition is not met, the terminal device determines not to send the measurement signal on the second uplink carrier by occupying at least one of the occasion and the period.

It should be noted that, it is assumed that, the network device configures that the terminal device sends the measurement signal in the N periods, and the terminal device finally sends the measurement signal in only some of the N periods. In this case, the terminal device may further send feedback information to the network device. The feedback information indicates one or more of the following: at least one of a period and an occasion that are determined to be not used to send the measurement signal on the second uplink carrier; a start period or a start occasion that is determined to be not used to send the measurement signal; and an end period or an end occasion that is determined to be not used to send the measurement signal.

For example, the network device configures five periods, and the five periods are respectively a period 1 to a period 5. Assuming that the terminal device determines not to send the measurement signal in a period 2 to a period 4, the feedback information may indicate the period 2 to the period 4, or may indicate the period 2 and the period 4.

Step 206: The network device receives the measurement signal from the terminal device on the second uplink carrier.

The measurement signal is sent by the terminal device when the terminal device determines that the first condition is met.

The network device may determine, based on the measurement signal received on the second uplink carrier, whether to activate the second uplink carrier. If the terminal device sends the measurement signal on the second uplink carrier in a plurality of periods, the network device may determine, based on the measurement signals received in the plurality of periods, whether to activate the second uplink carrier. In other words, the network device determines, based on the measurement signal received on the second uplink carrier, whether to activate the second uplink carrier. The network device may determine, based on one time (one-shot) of sending, whether to activate the second uplink carrier, or may perform layer 3 filtering on a plurality of values of received signal strength, to determine whether to activate the second uplink carrier. How the network device specifically determines whether to activate the second uplink carrier is not limited in this application. For example, reference may be made to descriptions in Embodiment 5. Details are not described herein.

In Embodiment 1, when the network device configures that the terminal device periodically sends the measurement signal on at least one uplink carrier, the terminal device determines whether a trigger condition is met, and the terminal device sends the measurement signal on a configured occasion or in a configured period only when the trigger condition is met. When the trigger condition is not met, the terminal device may not send the measurement signal, to reduce a quantity of times of sending the measurement signal, and reduce a quantity of times of interrupting uplink transmission of the terminal device.

Embodiment 2

In Embodiment 2, when a terminal device has a data transmission requirement or a scheduling requirement, the terminal device determines whether a trigger condition is met. When the trigger condition is met, the terminal device sends a scheduling request on a configured first resource. When the trigger condition is not met, the terminal device sends a scheduling request on a configured second sending resource. The scheduling request sent on the first resource triggers a network device to indicate sending of a measurement signal, and the scheduling request sent on the second resource does not trigger the network device to indicate sending of the measurement signal. Therefore, sending of the measurement signal is triggered based on a requirement, and interruption of uplink transmission of the terminal device is reduced. Embodiment 2 may be applied to a scenario in which the measurement signal is aperiodically sent, or may be applied to another scenario. This is not limited herein.

Figure 4:
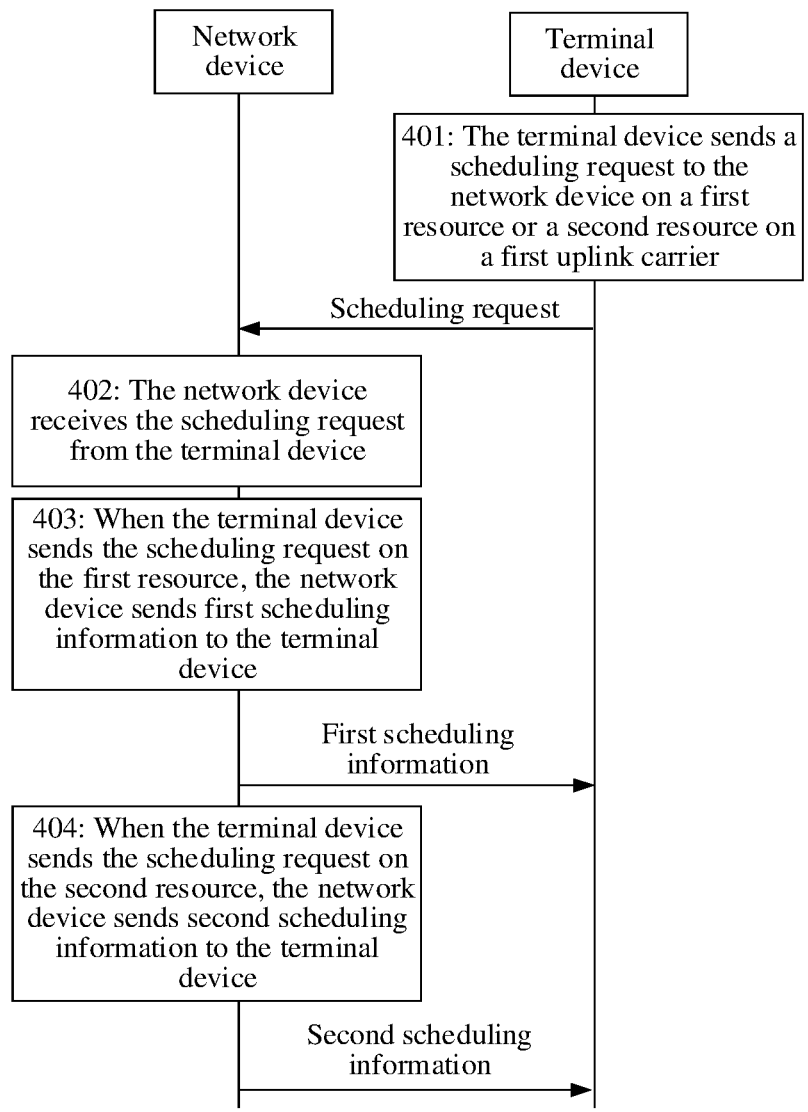
FIG. 4 is a schematic flowchart of a communication method according to an embodiment of this application.

FIG. 4 is a schematic flowchart of a communication method according to an embodiment of this application. The method includes the following steps.

Step 401: A terminal device sends a scheduling request to a network device on a first resource or a second resource on a first uplink carrier, where the scheduling request is used to request the network device to send scheduling information.

In this embodiment, the first uplink carrier includes an uplink resource.

In this embodiment of this application, the network device may configure the first resource and the second resource for the terminal device, and both the first resource and the second resource may be used to send the scheduling request.

Step 402: The network device receives the scheduling request from the terminal device.

Step 403: When the terminal device sends the scheduling request on the first resource, the network device sends first scheduling information to the terminal device, and correspondingly, the terminal device receives the first scheduling information from the network device.

The first scheduling information indicates the terminal device to send a measurement signal on a second uplink carrier. The first scheduling information may further indicate, to the terminal device, a resource used to send data. The resource used to send data is located on a NUL carrier. The NUL carrier may be the first uplink carrier, or may be a carrier, on a frequency band, that includes an uplink resource and that is different from the first uplink carrier.

Step 404: When the terminal device sends the scheduling request on the second resource, the network device sends second scheduling information to the terminal device, and correspondingly, the terminal device receives the second scheduling information from the network device.

The second scheduling information indicates, to the terminal device, a resource used to send data. The resource used to send data is located on a NUL carrier. The NUL carrier may be the first uplink carrier, or may be a carrier, on a frequency band, that includes an uplink resource and that is different from the first uplink carrier.

It should be noted that, when the first uplink carrier includes a downlink resource, either of the first scheduling information and the second scheduling information may be transmitted on the first uplink carrier. When the first uplink carrier does not include a downlink resource, the first scheduling information and the second scheduling information may be transmitted on a first downlink carrier associated with the first uplink carrier. In this embodiment of this application, the terminal device may determine, in the following manner, whether to send the scheduling request on the first resource or the second resource.

A first implementation may be applied to a case in which a first carrier is an uplink carrier and has an associated downlink carrier. When the terminal device determines that signal quality or signal strength on the downlink carrier associated with the first carrier is greater than or equal to a first threshold and an amount of to-be-transmitted uplink data of the terminal device is greater than or equal to a second threshold, the terminal device may determine to send the scheduling request on the first resource.

Correspondingly, when the terminal device determines that signal quality or signal strength on the downlink carrier associated with the first carrier is less than a first threshold or an amount of to-be-transmitted uplink data of the terminal device is less than a second threshold, the terminal device may determine to send the scheduling request on the second resource.

A second implementation may be applied to a TDD mode. A first carrier includes both the uplink resource and the downlink resource. When the terminal device determines that signal quality or signal strength on the first carrier is greater than or equal to a first threshold and an amount of to-be-transmitted uplink data of the terminal device is greater than or equal to a second threshold, the terminal device may determine to send the scheduling request on the first resource. The signal quality or signal strength on the first carrier is determined based on a downlink reference signal.

Correspondingly, when the terminal device determines that signal quality or signal strength on the first carrier is less than a first threshold or an amount of to-be-transmitted uplink data of the terminal device is less than a second threshold, the terminal device may determine to send the scheduling request on the second resource.

In this embodiment of this application, the scheduling request may be a scheduling request (SR) message.

In this embodiment of this application, the first scheduling information and the second scheduling information may be downlink control information (DCI). For ease of description, when the first scheduling information is DCI, the first scheduling information is referred to as first DCI; and when the second scheduling information is DCI, the second scheduling information is referred to as second DCI. The first DCI is different from the second DCI. The second DCI may be DCI for scheduling a physical uplink shared channel (PUSCH) in a 5G NR system or an LTE system. The PUSCH may be used to carry information such as a buffer status report (BSR) sent by the terminal device. For example, the second DCI may be any one of DCI 0-1, DCI 0-0, or DCI 0-2. For the DCI 0-1, the DCI 0-0, or the DCI 0-2, refer to descriptions in the 5G NR system or the LTE system. Details are not described herein again. In this embodiment of this application, when the first scheduling information is the first DCI, the first DCI may be DCI obtained by modifying the DCI 0-1, the DCI 0-0, or the DCI 0-2.

In this embodiment of this application, how to specifically implement the first scheduling information is not limited in this application. For example, reference may be made to descriptions in Embodiment 3. Details are not described herein.

According to the method, when sending the measurement signal, based on a configuration provided by the network device, the terminal device sends the measurement signal on a corresponding resource when a trigger condition is met, so that the network device can trigger, before obtaining the BSR of the terminal device and before learning of RSRP of the terminal device, the terminal device to aperiodically send the measurement signal, to activate a carrier for the terminal device based on the measurement signal, and meet an uplink carrier capacity expansion requirement of the terminal device.

Embodiment 3

In an embodiment of this application, there may be a plurality of implementations of first scheduling information. For details, refer to the following descriptions.

Figure 5:
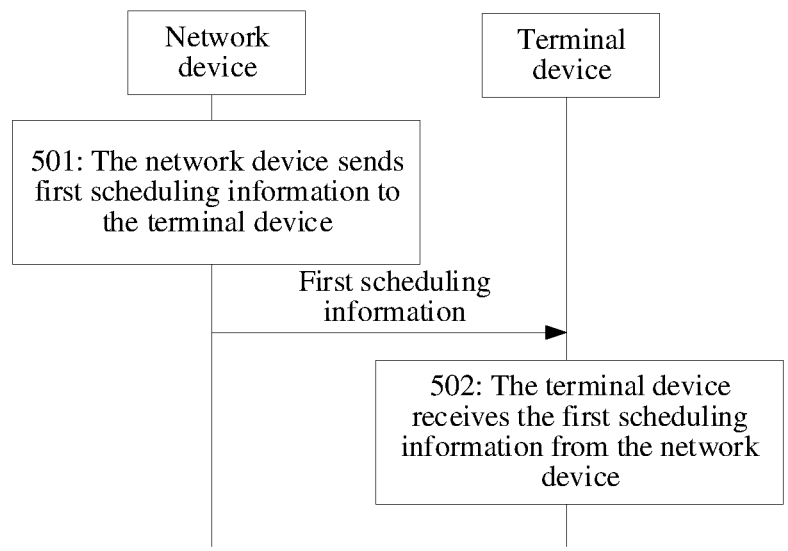
FIG. 5 is a schematic flowchart of a communication method according to an embodiment of this application.

FIG. 5 is a schematic flowchart of a communication method according to an embodiment of this application. The method includes the following steps.

Step 501: A network device sends first scheduling information to a terminal device.

When a first uplink carrier does not include a downlink resource, the first scheduling information may be transmitted on a downlink carrier associated with the first uplink carrier. When the first uplink carrier includes a downlink resource, the first scheduling information may be transmitted on the downlink resource on the first uplink carrier.

Optionally, the first scheduling information may be first DCI, for example, may be DCI obtained by modifying DCI 0-1, DCI 0-0, or DCI 0-2.

Optionally, when a scheduling request is received on a first resource on the first uplink carrier, the network device may determine to send the first scheduling information. For details, refer to the descriptions in Embodiment 2. Details are not described herein again.

In this embodiment of this application, the first scheduling information may include first information and second information. The first information indicates the terminal device to send a measurement signal on a second uplink carrier, and the second information indicates a resource used to send data on the first uplink carrier.

That the first information indicates the terminal device to send the measurement signal on the second uplink carrier may mean that the first information is indication information indicating whether to send the measurement signal on the second uplink carrier. For example, when a value of a bit corresponding to the first information is a first value, the first information indicates the terminal device to send the measurement signal on the second uplink carrier; or when a value of a bit corresponding to the first information is a second value, the first information indicates the terminal device not to send the measurement signal on the second uplink carrier.

That the first information indicates the terminal device to send the measurement signal on the second uplink carrier may alternatively mean that the first information is indication information indicating to send the measurement signal on the second uplink carrier. In this case, when the first scheduling information includes the first information, it may indicate that the terminal device is indicated to send the measurement signal on the second uplink carrier; or when the terminal device is not indicated to send the measurement signal on the second uplink carrier, the first scheduling information may not include the first information.

For example, the first information is used to trigger the terminal device to use a second pattern, and the second pattern indicates at least one of a sending sequence and an occasion for sending the measurement signal on at least one second uplink carrier by the terminal device. When the first scheduling information includes the first information, the terminal device sends the measurement signal on the at least one second uplink carrier based on the second pattern. When the first scheduling information does not include the first information, the terminal device determines not to send the measurement signal on the at least one second uplink carrier.

When the second information indicates the resource used to send data on the first uplink carrier, in a possible implementation, the second information may be used to schedule a PUSCH. For example, the second information may be at least one of time domain resource indication information, frequency domain resource indication information, a redundancy version, or a new data indicator that is transmitted on the scheduled PUSCH. The PUSCH may be used to carry information such as a BSR sent by the terminal device.

In this embodiment of this application, the first scheduling information may further include third information, and the third information is used to trigger the terminal device to send the measurement signal on the first uplink carrier.

In a possible implementation, a bit occupied by the first information and a bit occupied by the third information in the first scheduling information are jointly coded, to form a code point. Different code points correspond to different triggering situations. Therefore, the terminal device can distinguish, based on different code points, that the measurement signal that is triggered to be transmitted is on a first carrier, or on the at least one second uplink carrier, or on a first carrier and the at least one second uplink carrier. In an example, when the code point is 01, it indicates that the measurement signal that is triggered to be transmitted is on the first carrier; when the code point is 10, it indicates that the measurement signal that is triggered to be transmitted is on the at least one second uplink carrier; and when the code point is 11, it indicates that the measurement signal that is triggered to be transmitted is on both the first carrier and the at least one second uplink carrier.

In another possible implementation, a bit occupied by the first information and a bit occupied by third information in the first scheduling information are located in one field. Different bit states in the field correspond to different triggering situations. Therefore, the terminal device can distinguish, based on different bit states, that the measurement signal that is triggered to be transmitted is on a first carrier, or on the at least one second uplink carrier, or on a first carrier and the at least one second uplink carrier. In an example, when the bit state is 01, it indicates that the measurement signal that is triggered to be transmitted is on the first carrier; when the bit state is 10, it indicates that the measurement signal that is triggered to be transmitted is on the at least one second uplink carrier; and when the bit state is 11, it indicates that the measurement signal that is triggered to be transmitted is on both the first carrier and the at least one second uplink carrier.

In another possible implementation, a bit occupied by the first information is located in a first information block of the first scheduling information, and a bit occupied by the third information is located in a second information block of the first scheduling information. "First/Second" is merely used as an example. Therefore, the terminal device can distinguish, based on different information blocks, whether the measurement signal that is triggered to be transmitted is on the first carrier or on the at least one second uplink carrier. In an example, when a bit in the first information block is 1, it indicates that the measurement signal that is triggered to be transmitted is on the at least one second uplink carrier; or when a bit in the second information block is 1, it indicates that the measurement signal that is triggered to be transmitted is on the first carrier.

In an example, the measurement signal that is triggered to be transmitted in the three implementations is the second pattern on the at least one second uplink carrier.

Optionally, the first scheduling information further indicates one or more of the following information:
  an occasion and/or a period for sending the measurement signal on the first uplink carrier; an occasion and/or a period for sending the measurement signal on the second uplink carrier; a quantity N of measurement signals sent on the second uplink carrier, where N is an integer greater than 0; and a quantity of times of repeated transmission of the measurement signal sent on the second uplink carrier. For example, the measurement signal is transmitted through semi-persistent scheduling (SPS). The first scheduling information includes an index corresponding to transmission performed through SPS.

The first scheduling information may indicate the foregoing information by using a reserved bit, or may indicate the foregoing information by adding a new field. This is not limited in this embodiment of this application.

Step 502: The terminal device receives the first scheduling information from the network device.

After receiving the first scheduling information, the terminal device may send the measurement signal on the at least one second uplink carrier based on the first scheduling information.

For example, it is assumed that the network device configures the at least one second uplink carrier, and the first information in the first scheduling information triggers the terminal device to use the second pattern. The terminal device may send the measurement signal on the at least one second uplink carrier based on the second pattern.

For example, it is assumed that the second pattern may be shown in FIG. 3. The terminal device may sequentially send the measurement signal on a symbol 0 on a carrier 1, send the measurement signal on a symbol 3 on a carrier 2, send the measurement signal on a symbol 6 on a carrier 3, and send the measurement signal on a symbol 9 on the carrier 1.

It should be noted that when the terminal device is handed over between different carriers, radio frequency re-adjustment needs to be performed. For example, when the terminal is handed over from the carrier 1 to the carrier 2, a radio frequency transmit channel also needs to adapt from a frequency of the carrier 1 to a frequency of the carrier 2. Because the frequency of the carrier 1 and the frequency of the carrier 2 are different, it takes a specific period of time to re-adjust, from one frequency to another frequency, a frequency to which the radio frequency transmit channel adapts. The period of time may be recorded as a radio frequency re-adjustment time or a radio frequency retuning time. The radio frequency retuning time may also be referred to as a radio frequency retuning delay or a radio frequency retuning gap. For ease of description, the radio frequency retuning time is used for description below.

As shown in FIG. 3, data transmission is interrupted in a handover process. As described above, a data transmission interruption time period includes the radio frequency retuning time. Therefore, reducing the radio frequency retuning time can reduce the data transmission interruption time period, and help improve system performance. The radio frequency retuning time is related to software and hardware configurations of the terminal, especially to software and hardware configurations for radio frequency processing of the terminal.

The network device may determine, based on the measurement signal received on the second uplink carrier, whether to activate the second uplink carrier. If the terminal device sends a plurality of measurement signals on the second uplink carrier, the network device may determine, based on the plurality of measurement signals, whether to activate the second uplink carrier. How the network device specifically determines whether to activate the second uplink carrier is not limited in this application. For example, reference may be made to descriptions in Embodiment 5. Details are not described herein.

According to the method, when the terminal device sends the measurement signal, based on a configuration provided by the network device, the terminal device sends the measurement signal on a corresponding resource when a trigger condition is met. In this way, the network device can trigger the terminal device to aperiodically send the measurement signal, to activate a carrier for the terminal device based on the measurement signal. Therefore, an uplink carrier capacity expansion requirement of the terminal device is met.

Embodiment 4

After a network device determines an activated carrier based on a measurement signal, a terminal device may not send the measurement signal on the activated carrier, so that unnecessary sending of the measurement signal is reduced, and a data transmission interruption time period caused by sending of the measurement signal is reduced. Details are described below.

Figure 6:
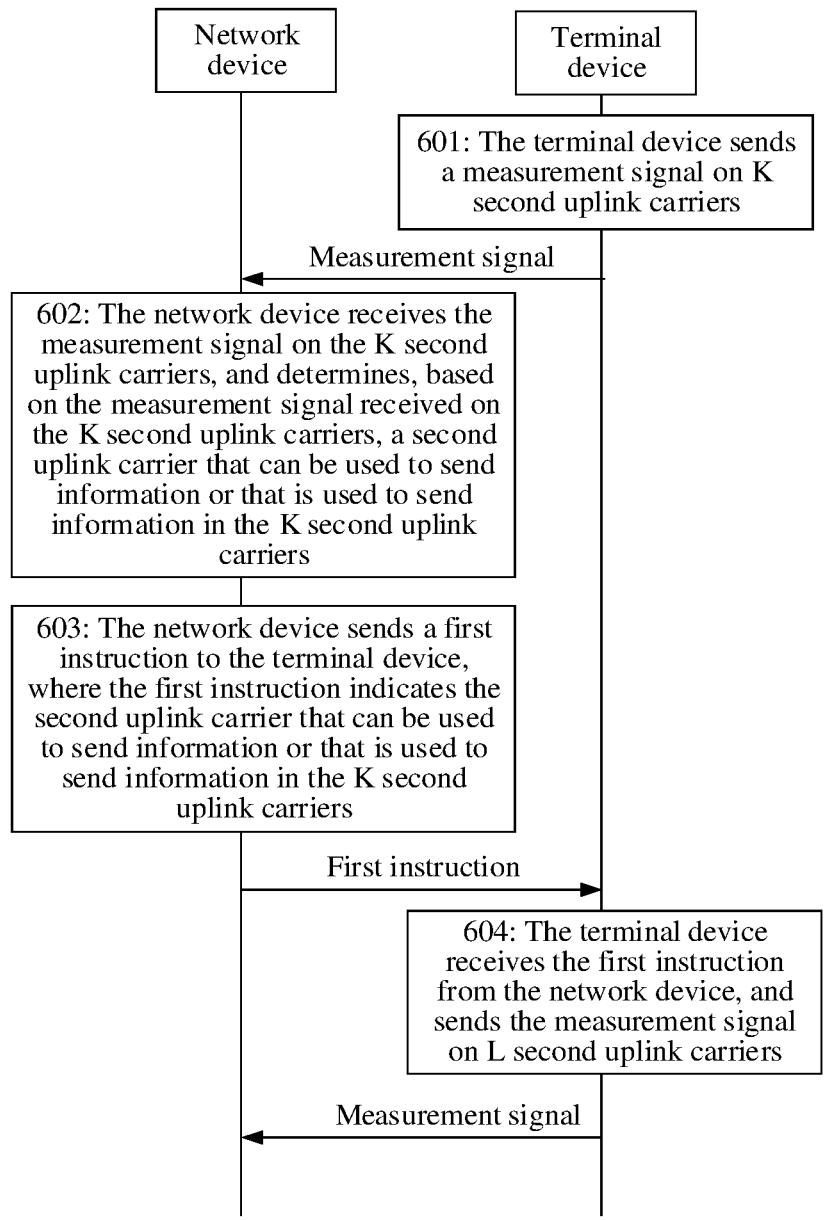
FIG. 6 is a schematic flowchart of a communication method according to an embodiment of this application.

FIG. 6 is a schematic flowchart of a communication method according to an embodiment of this application. The method includes the following steps.

Step 601: A terminal device sends a measurement signal on K second uplink carriers.

Herein, K is an integer greater than 0.

It should be noted that the terminal device may receive a second instruction from a network device. The second instruction indicates K occasions for sending the measurement signal on the K second uplink carriers. The K occasions are in a one-to-one correspondence with the K second uplink carriers. The occasion may indicate at least one of a quantity of symbols occupied by a measurement signal sent on one carrier and an occupied symbol location. In this embodiment of this application, the K occasions corresponding to the K second uplink carriers may be indicated by using a pattern. For example, the second instruction includes an identifier of a third pattern, and the third pattern may include the K occasions.

Figure 7:
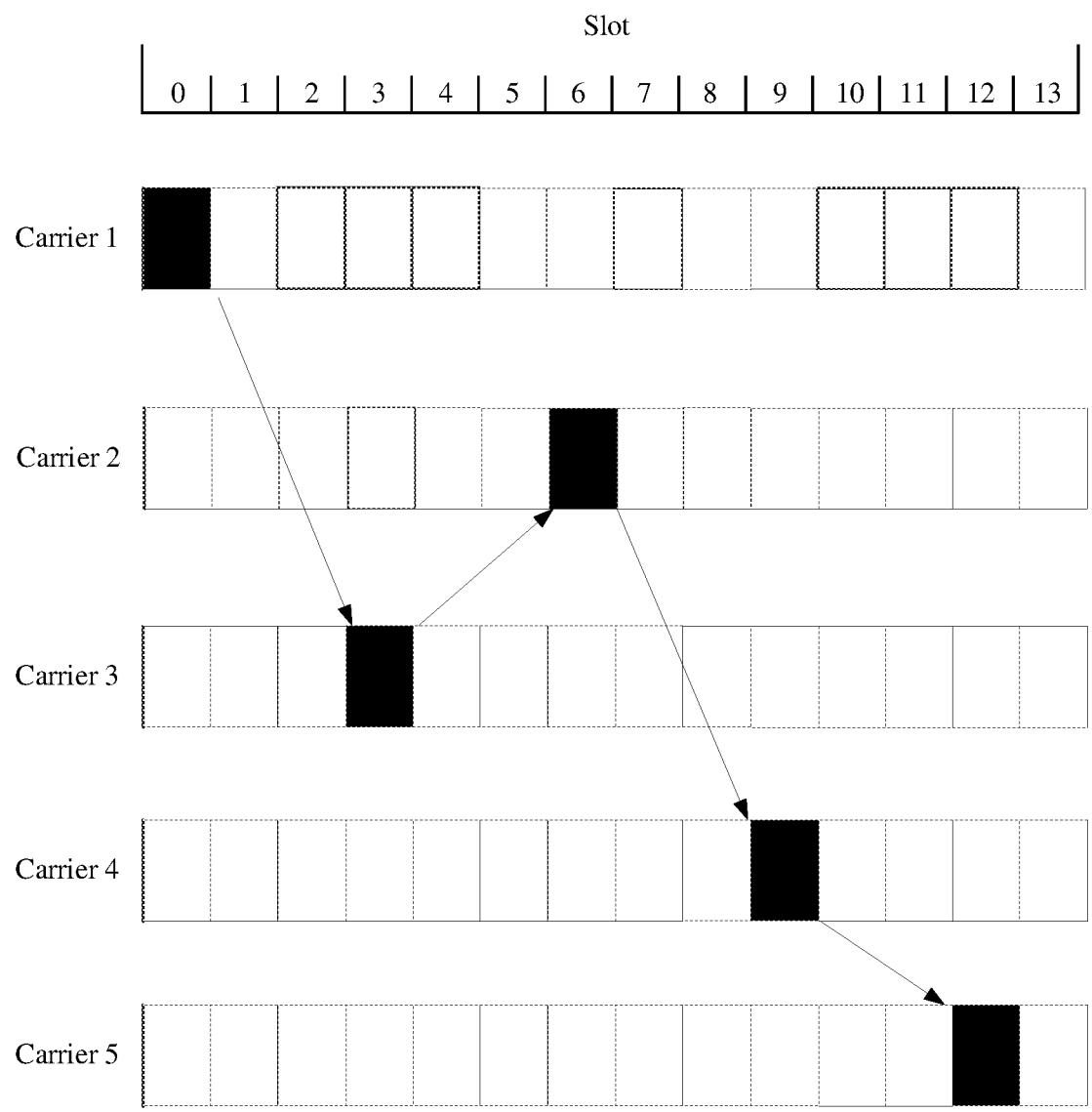
FIG. 7 is a schematic diagram of a pattern according to an embodiment of this application.

For example, K is equal to 5, and the third pattern may be shown in FIG. 7. In FIG. 7, an example in which one slot includes 14 symbols (which are respectively a symbol 0 to a symbol 13) is used for description. The pattern in FIG. 7 indicates occasions for sending the measurement signal on five carriers (a carrier 1 to a carrier 5). Specifically, an occasion for the measurement signal on the carrier 1 is: occupying the symbol 0 and occupying one symbol; an occasion for the measurement signal on a carrier 2 is: occupying a symbol 3 and occupying one symbol; an occasion for the measurement signal on a carrier 3 is: occupying a symbol 6 and occupying one symbol; an occasion for the measurement signal on a carrier 4 is: occupying a symbol 9 and occupying one symbol; and an occasion for the measurement signal on the carrier 5 is: occupying a symbol 12 and occupying one symbol. The terminal device may send the measurement signal on each carrier based on the occasions indicated by the pattern in FIG. 7.

It should be noted that for how the terminal device specifically sends the measurement signal, further refer to the descriptions in Embodiment 1 or Embodiment 2.

Step 602: The network device receives the measurement signal on the K second uplink carriers, and determines, based on the measurement signal received on the K second uplink carriers, a second uplink carrier that is capable of being used to send information or that is used to send information in the K second uplink carriers.

The second uplink carrier that is capable of being used to send information or that is used to send information may be an activated second uplink carrier.

How the network device specifically determines whether to activate the second uplink carrier is not limited in this application. For example, reference may be made to descriptions in Embodiment 5. Details are not described herein.

Step 603: The network device sends a first instruction to the terminal device, where the first instruction indicates the second uplink carrier that is capable of being used to send information or that is used to send information in the K second uplink carriers.

Step 604: The terminal device receives the first instruction from the network device, and sends a measurement signal on L second uplink carriers.

When determining, based on the first instruction, the second uplink carrier that is capable of being used to send information or that is used to send information in the K second uplink carriers, the terminal device does not send the measurement signal on a second uplink carrier that cannot be used to send information or that is not used to send information. In other words, the L second uplink carriers each are a second uplink carrier in the K second uplink carriers that is different from the second uplink carrier that is capable of being used to send information or that is used to send information, and L is an integer less than or equal to and K.

In this embodiment of this application, L occasions for sending the measurement signal on the L second uplink carriers may be configured by the network device, or may be independently determined by the terminal device. This is not limited in this embodiment of this application.

When the L occasions are configured by the network device, the terminal device may receive a third instruction from the network device. The third instruction indicates the L occasions for sending the measurement signal on the L second uplink carriers. The L occasions indicated by the third instruction may be determined by the network device, for example, determined by the network device based on the K occasions for sending the measurement signal on the K second uplink carriers.

When the L occasions are independently determined by the terminal device, there may be a plurality of implementations of specifically determining the L occasions. For example, the L occasions may be determined based on the K occasions for sending the measurement signal on the K second uplink carriers, or may be determined in another manner.

It should be noted that, when the L occasions are determined based on the K occasions, a sequence relationship between the L second uplink carriers on which the measurement signal is sent on the K occasions may be the same as a sequence relationship between the L second uplink carriers on which the measurement signal is sent on the L occasions, or a sequence relationship between the L second uplink carriers on which the measurement signal is sent on the L occasions is the same as a sequence relationship between the K second uplink carriers on which the measurement signal is sent on the K occasions.

For example, the L second uplink carriers include a carrier 1 and a carrier 2. In the K occasions, an occasion corresponding to the carrier 1 is located before an occasion corresponding to the carrier 2. Therefore, in the L occasions determined based on the K occasions, the occasion corresponding to the carrier 1 is still located before the occasion corresponding to the carrier 2.

Implementation 1: The L occasions are L occasions that first appear in time domain in the K occasions, and the L occasions are in a one-to-one correspondence with the L second uplink carriers.

In other words, in this implementation, the L occasions may be L occasions that are earlier in time domain in the K occasions.

Figure 8:
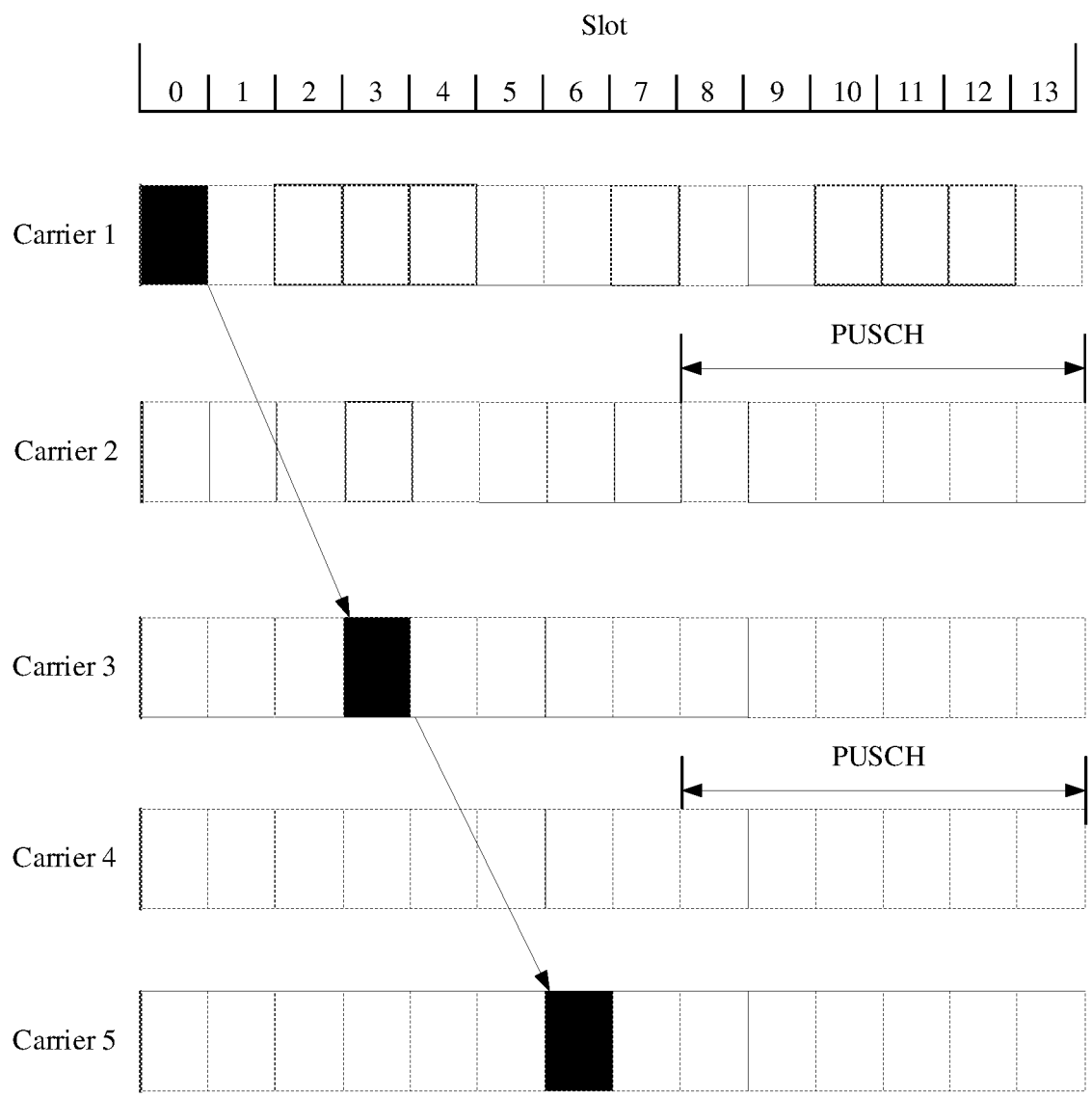
FIG. 8 is a schematic diagram of a pattern according to an embodiment of this application.

For ease of description, in the following, a carrier that is capable of being used to send information or that is used to send information is referred to as an activated carrier, and a carrier that cannot be used to send information or that is not used to send information is referred to as an inactive carrier. For example, with reference to FIG. 7, it is assumed that the carrier 2 and the carrier 4 are activated carriers. In this case, first three occasions in five occasions may be used as occasions for the three inactive carriers. Specifically, as shown in FIG. 8, an occasion for the measurement signal on a carrier 1 is: occupying a symbol 0 and occupying one symbol; an occasion for the measurement signal on a carrier 3 is: occupying a symbol 3 and occupying one symbol; and an occasion for the measurement signal on a carrier 5 is: occupying a symbol 6 and occupying one symbol.

In this implementation, if a first occasion in the L occasions that first appear in time domain in the K occasions is not located at a start point (a start symbol or the symbol 0) of a slot, each of the L occasions may be further offset forward by x symbols in time domain, where x is equal to a difference between an index of a start symbol occupied by the first occasion and an index of the start symbol of the slot.

In other words, when the K occasions are located in a same slot, the L occasions may be occasions obtained after the L occasions that first appear in the K occasions are offset forward by x symbols in time domain.

Figure 9:
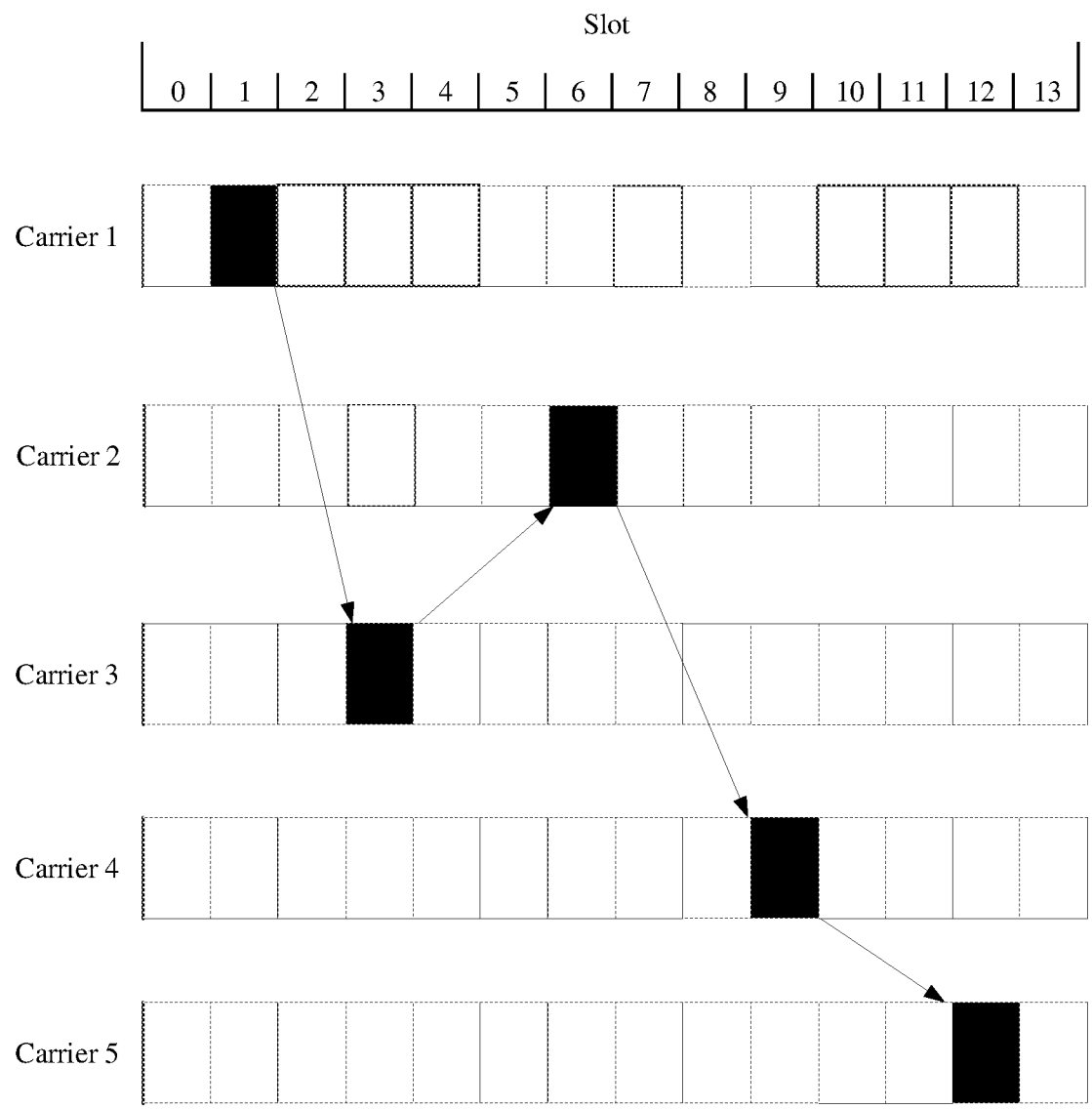
FIG. 9 is a schematic diagram of a pattern according to an embodiment of this application.

For example, K is equal to 5, and the third pattern may be shown in FIG. 9. In FIG. 9, an example in which one slot includes 14 symbols (which are respectively a symbol 0 to a symbol 13) is used for description. The pattern in FIG. 9 indicates occasions for sending the measurement signal on five carriers (a carrier 1 to a carrier 5). Specifically, an occasion for the measurement signal on the carrier 1 is: occupying the symbol 1 and occupying one symbol; an occasion for the measurement signal on a carrier 2 is: occupying a symbol 3 and occupying one symbol; an occasion for the measurement signal on a carrier 3 is occupying a symbol 6 and occupying one symbol; an occasion for the measurement signal on a carrier 4 is occupying a symbol 9 and occupying one symbol; and an occasion for the measurement signal on the carrier 5 is occupying a symbol 12 and occupying one symbol.

Figure 10:
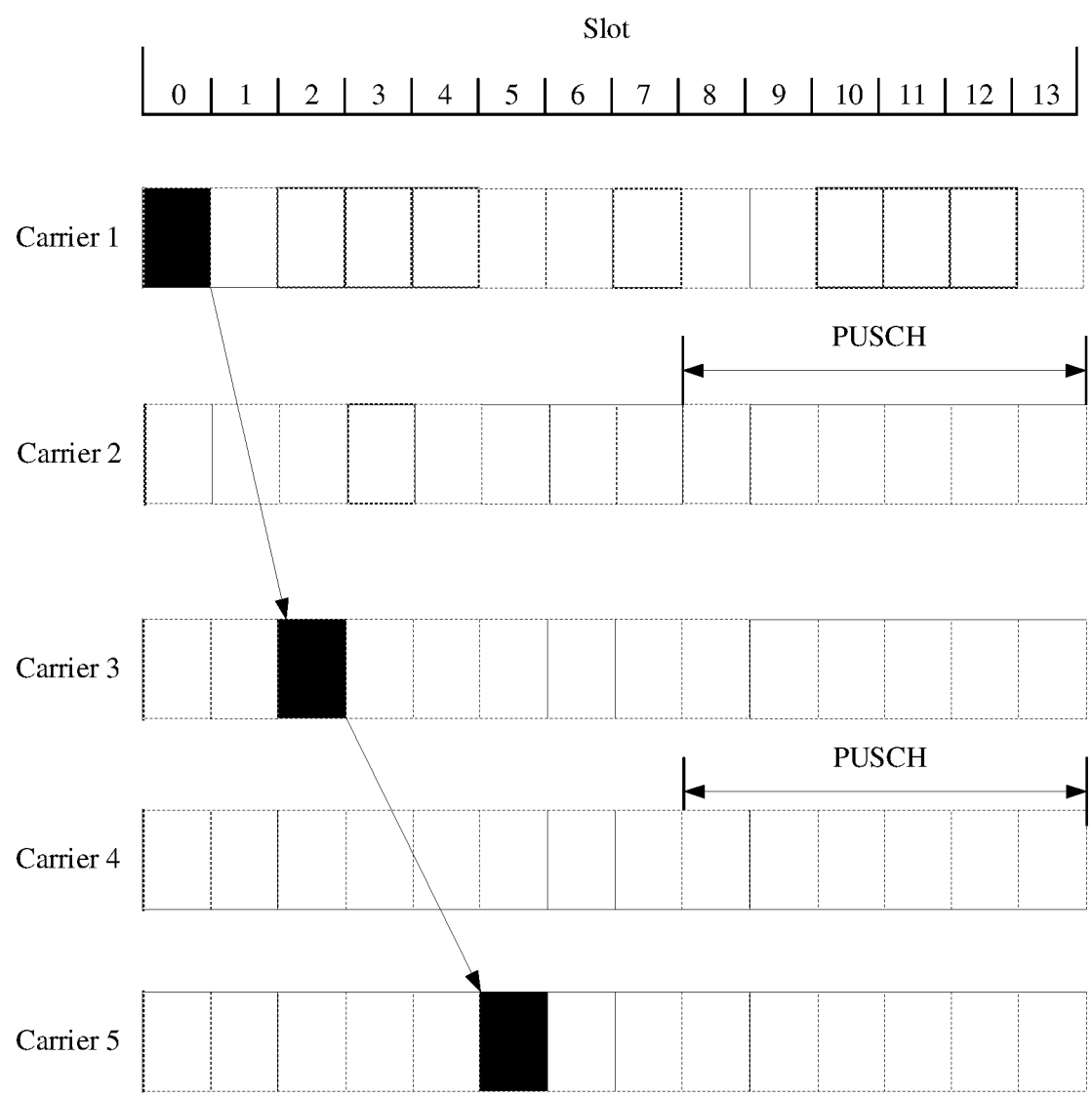
FIG. 10 is a schematic diagram of a pattern according to an embodiment of this application.

It is assumed that the carrier 2 and the carrier 4 are activated carriers. In this case, three occasions that first appear in the five occasions in FIG. 9 may be used as occasions for the three inactive carriers. Because the occasion on the carrier 1 occupies the symbol 1, and a difference between an index of the symbol 1 and the index of the start symbol of the slot is x=1, symbols occupied by the three occasions that first appear are offset forward by one symbol, and obtained L occasions may be shown in FIG. 10. In FIG. 10, an occasion for the measurement signal on a carrier 1 is: occupying a symbol 0 and occupying one symbol; an occasion for the measurement signal on a carrier 3 is: occupying a symbol 2 and occupying one symbol; and an occasion for the measurement signal on a carrier 5 is: occupying a symbol 5 and occupying one symbol.

In this implementation, when the L occasions are configured by the network device, the network device may indicate a fourth pattern, and the fourth pattern indicates the L occasions. For example, when the K third patterns are the pattern shown in FIG. 7, the fourth pattern may be the pattern shown in FIG. 8.

It should be noted that, in this implementation, on an activated carrier, some symbols in symbols other than symbols occupied by the L occasions in the slot may be used for PUSCH transmission. For example, in FIG. 8, symbols 8 to 13 of the carrier 2 and the carrier 4 may be used for PUSCH transmission.

Implementation 2: The L occasions are L occasions that last appear in time domain in the K occasions, and the L occasions are in a one-to-one correspondence with the L second uplink carriers.

In other words, in this implementation, the L occasions may be L occasions that are later in time domain in the K occasions. Alternatively, when the K sending occasions are located in a same slot, the L sending occasions may be L sending occasions before an end point of the slot in the K sending occasions.

Figure 11:
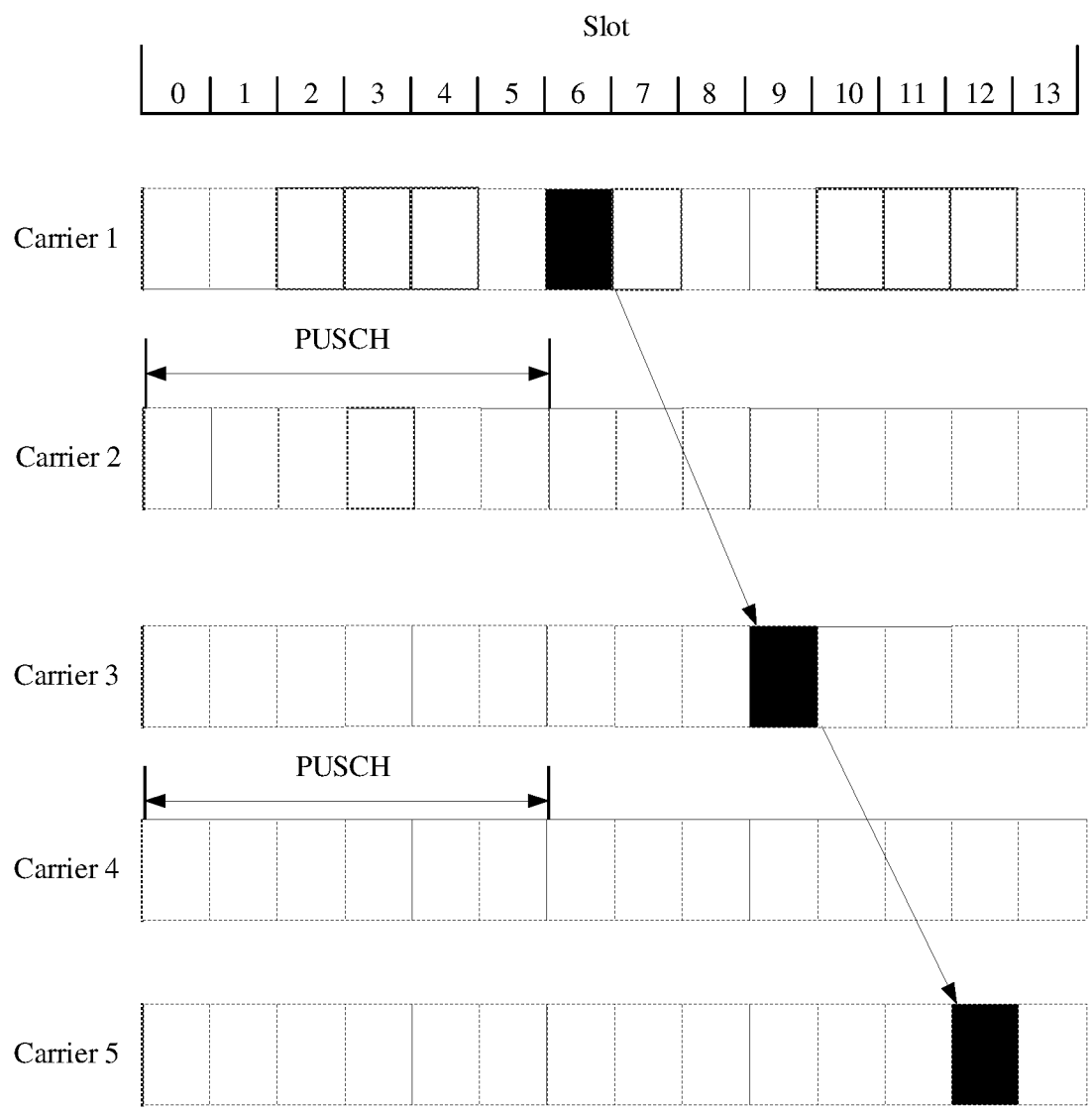
FIG. 11 is a schematic diagram of a pattern according to an embodiment of this application.

For example, with reference to FIG. 7, it is assumed that the carrier 2 and the carrier 4 are activated carriers. In this case, three occasions that last appear in five occasions may be used as occasions for the three inactive carriers. Specifically, as shown in FIG. 11, an occasion for the measurement signal on a carrier 1 is: occupying a symbol 0 and occupying one symbol; an occasion for the measurement signal on a carrier 3 is: occupying a symbol 3 and occupying one symbol; and an occasion for the measurement signal on a carrier 5 is: occupying a symbol 6 and occupying one symbol.

In this implementation, if a last occasion in the L occasions that last appear in time domain in the K occasions is not located at the end point (an end symbol or a symbol 13) of the slot, each of the L occasions may be further offset backward by y symbols in time domain, where y is equal to a difference between an index of a start symbol occupied by a last sending occasion and an index of the end symbol of the slot.

In other words, when the K occasions are located in a same slot, the L occasions may be occasions obtained after the L occasions that last appear in the K occasions are offset backward by y symbols in time domain.

Figure 12:
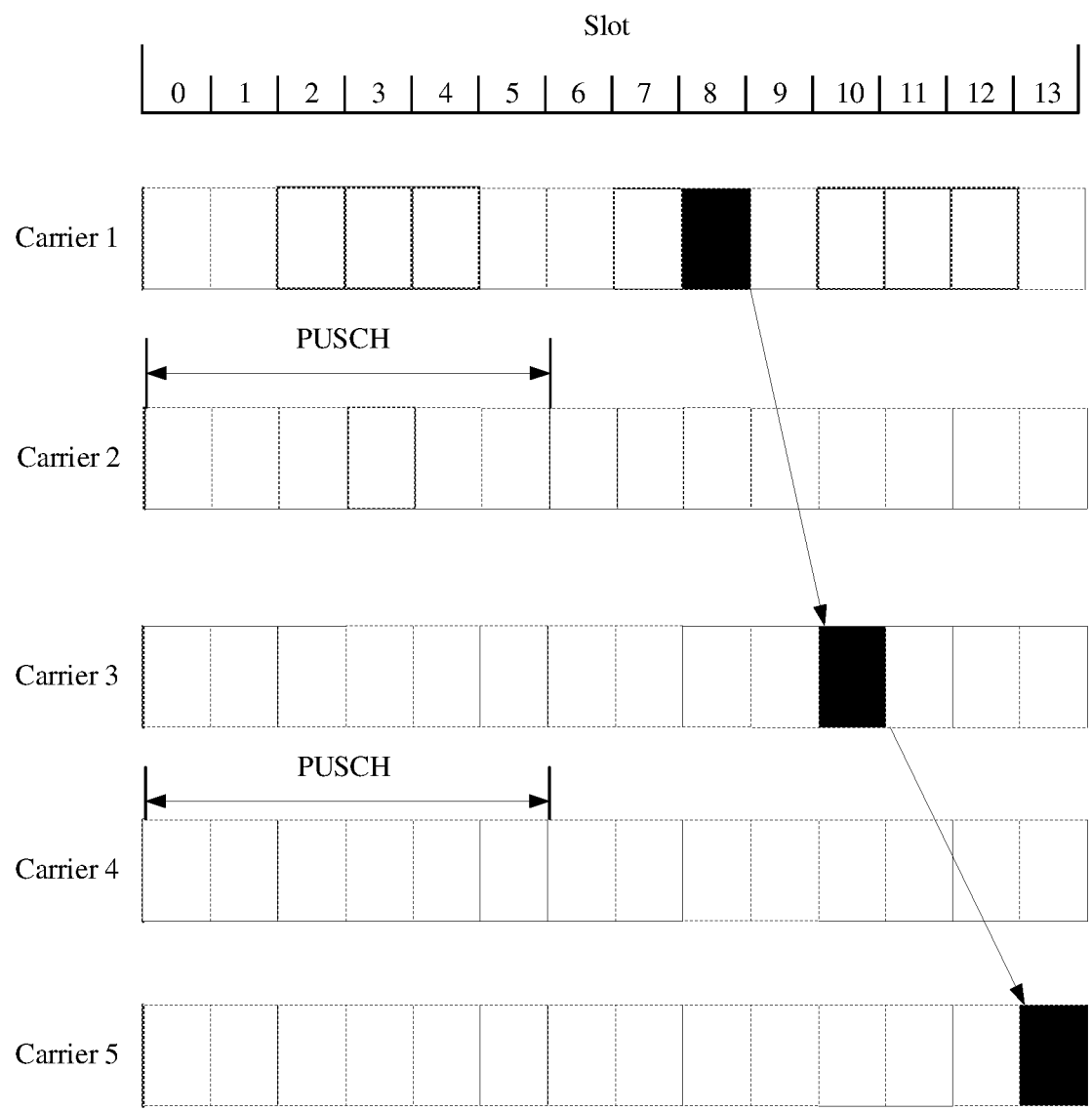
FIG. 12 is a schematic diagram of a pattern according to an embodiment of this application.

For example, with reference to FIG. 7, it is assumed that the carrier 2 and the carrier 4 are activated carriers. In this case, three occasions that last appear in five occasions in FIG. 7 may be used as occasions for the three inactive carriers. Because the occasion on the carrier 5 occupies the symbol 12, and a difference between an index of the symbol 12 and the index of the end symbol of the slot is y=1, symbols occupied by the three occasions that last appear are offset backward by one symbol, and obtained L occasions may be shown in FIG. 12. In FIG. 12, an occasion for the measurement signal on a carrier 1 is: occupying a symbol 8 and occupying one symbol; an occasion for the measurement signal on a carrier 3 is: occupying a symbol 10 and occupying one symbol; and an occasion for the measurement signal on a carrier 5 is: occupying a symbol 13 and occupying one symbol.

In this implementation, when the L occasions are configured by the network device, the network device may indicate a fourth pattern, and the fourth pattern indicates the L occasions. For example, when the K third patterns are the pattern shown in FIG. 7, the fourth pattern may be the pattern shown in FIG. 8.

It should be noted that, in this implementation, on an activated carrier, some symbols in symbols other than symbols occupied by the L occasions in the slot may be used for PUSCH transmission. For example, in FIG. 11, symbols 0 to 5 of the carrier 2 and the carrier 4 may be used for PUSCH transmission.

Implementation 3: The L occasions are L occasions corresponding to the L second uplink carriers in the K occasions.

Figure 13:
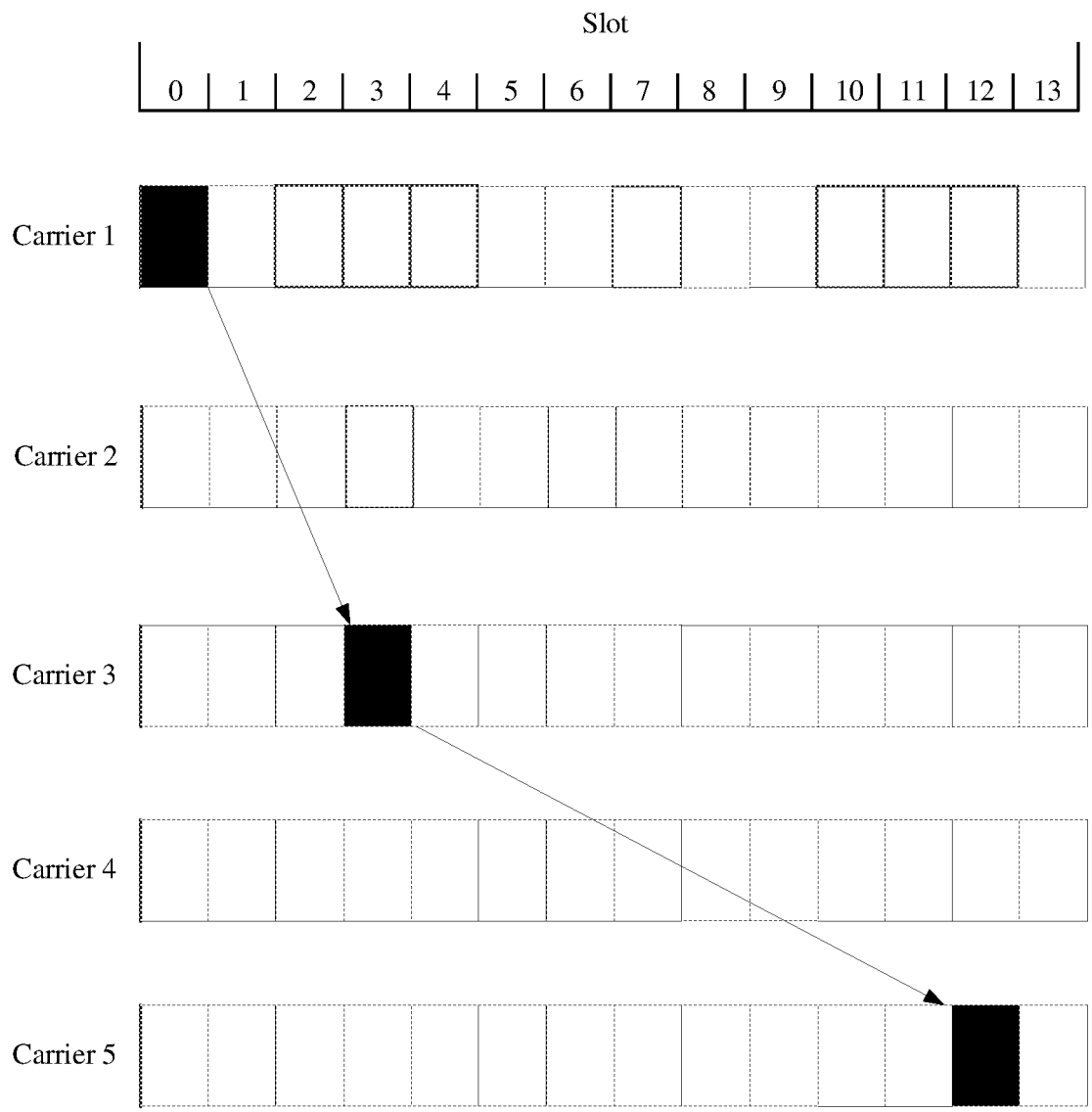
FIG. 13 is a schematic diagram of a pattern according to an embodiment of this application.

For example, with reference to FIG. 7, it is assumed that the carrier 2 and the carrier 4 are activated carriers. The measurement signal is no longer sent on an inactive carrier. In this case, L occasions may be shown in FIG. 13. In FIG. 13, an occasion for the measurement signal on a carrier 1 is: occupying a symbol 0 and occupying one symbol; an occasion for the measurement signal on a carrier 3 is: occupying a symbol 3 and occupying one symbol; and an occasion for the measurement signal on a carrier 5 is: occupying a symbol 13 and occupying one symbol.

Optionally, in this application, before sending the measurement signal on the second uplink carrier, the terminal device may further report capability information of the terminal device to the network device. The capability information indicates that the terminal device can send the measurement signal on the uplink carrier one by one in a switching manner. After receiving the capability information, the network device provides a corresponding configuration. A report of the capability information is applicable to any embodiment of this application.

It should be noted that the implementation is merely used as an example for description, and there may be another implementation for determining the L occasions. Examples are not listed herein one by one.

Embodiment 5

In an embodiment of this application, a network device may determine, based on signal quality or signal strength of a measurement signal received on a carrier, whether the carrier is capable of being used to send information or is used to send information. For ease of description, in the following, a carrier that is capable of being used to send information or that is used to send information is referred to as an activated carrier, and a carrier that cannot be used to send information or that is not used to send information is referred to as an inactive carrier. The following provides detailed descriptions.

Step 1: A network device receives at least one measurement signal on a second uplink carrier.

The measurement signal may be periodically sent by a terminal device, or may be aperiodically sent. For a meaning of the measurement signal, refer to the descriptions in the foregoing embodiments. Details are not described herein again.

Step 2: The network device determines, based on a measurement result of the at least one measurement signal, whether the second uplink carrier is capable of being used to send information or is used to send information.

Step 3: When determining that the activated second uplink carrier is capable of being used to send information or is used to send information, the network device sends activation information to the terminal device, where the activation information indicates that the second uplink carrier is capable of being used to send information or is used to send information.

The network device may send the activation information on a first uplink carrier.

In this application, there are a plurality of implementations of specifically determining whether the second uplink carrier is capable of being used to send information or is used to send information. In an implementation, when signal quality or signal strength of each of the at least one measurement signal is greater than or equal to a third threshold, it is determined that the second uplink carrier is capable of being used to send information or is used to send information; or when signal quality or signal strength of one or more measurement signals is less than a third threshold, it is determined that the second uplink carrier cannot be used to send information or is not used to send information.

The third threshold may be preconfigured, or may be determined in another manner. This is not limited in this application. For a specific meaning of the signal strength, refer to the descriptions in the foregoing embodiments. Details are not described herein again.

In another implementation, when a quantity of measurement signals whose signal quality or signal strength is greater than or equal to a third threshold in the at least one measurement signal is greater than or equal to H, it is determined that the second uplink carrier is capable of being used to send information or is used to send information; or when a quantity of measurement signals whose signal quality or signal strength is greater than or equal to a third threshold in the at least one measurement signal is less than H, it is determined that the second uplink carrier cannot be used to send information or is not used to send information. H is a number greater than 0.

In another implementation, when an average value of signal quality or signal strength of the at least one measurement signal is greater than or equal to a third threshold, it is determined that the second uplink carrier is capable of being used to send information or is used to send information; or when an average value of signal strength of the at least one measurement signal is less than a third threshold, it is determined that the second uplink carrier cannot be used to send information or is not used to send information.

The foregoing descriptions are merely examples, and there may be another manner of determining whether the second uplink carrier is capable of being used to send information or is used to send information. Details are not listed one by one herein.

In this embodiment of this application, when the measurement signal is transmitted through semi-persistent scheduling SPS, if a scheduled measurement signal is transmitted in N periods or on N occasions, or a quantity of times of repeated transmission of the scheduled measurement signal is K, the network device may further receive feedback information from the terminal device. The feedback information may indicate a period in which or an occasion on which the terminal device does not send the measurement signal, or indicate a quantity of repetition times that the terminal device does not send the measurement signal.

When performing layer 3 filtering on the signal strength of the at least one measurement signal on the second uplink carrier, the period in which or the occasion on which the terminal device does not send the measurement signal or the quantity of repetition times are set to zero. According to the method, wrong determining caused when the network device cannot determine a period or an occasion for sending the measurement signal or the quantity of repetition times, to improve a filtering deviation of a filtering operation.

In the foregoing embodiments provided in this application, the methods provided in embodiments of this application are separately described from a perspective of interaction between devices. To implement functions in the method provided in the foregoing embodiments of this application, the network device or the terminal device may include a hardware structure and/or a software module, and implement the foregoing functions in a form of the hardware structure, a software module, or a combination of the hardware structure and the software module. Whether a function in the foregoing functions is performed by using the hardware structure, the software module, or the combination of the hardware structure and the software module depends on particular applications and design constraints of the technical solutions.

In embodiments of this application, division into modules is an example, and is merely a logical function division. In an actual implementation, another division manner may be used. In addition, functional modules in embodiments of this application may be integrated into one processor, or may exist alone physically, or two or more modules may be integrated into one module. The integrated module may be implemented in a form of hardware, or may be implemented in a form of a software functional module.

Figure 14:
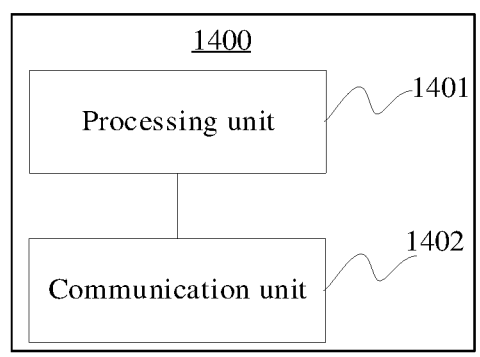
FIG. 14 is a schematic diagram of a structure of a communication apparatus according to an embodiment of this application.

Same as the foregoing concept, as shown in FIG. 14, an embodiment of this application further provides an apparatus 1400, configured to implement functions of the network device or the terminal device in the foregoing method. For example, the apparatus may be a software module or a chip system. In this embodiment of this application, the chip system may include a chip, or may include a chip and another discrete component. The apparatus 1400 may include a processing unit 1401 and a communication unit 1402.

In this embodiment of this application, the communication unit may also be referred to as a transceiver unit, and may include a sending unit and/or a receiving unit, which are respectively configured to perform sending and receiving steps of the network device or the terminal device in the foregoing method embodiments.

Figure 15:
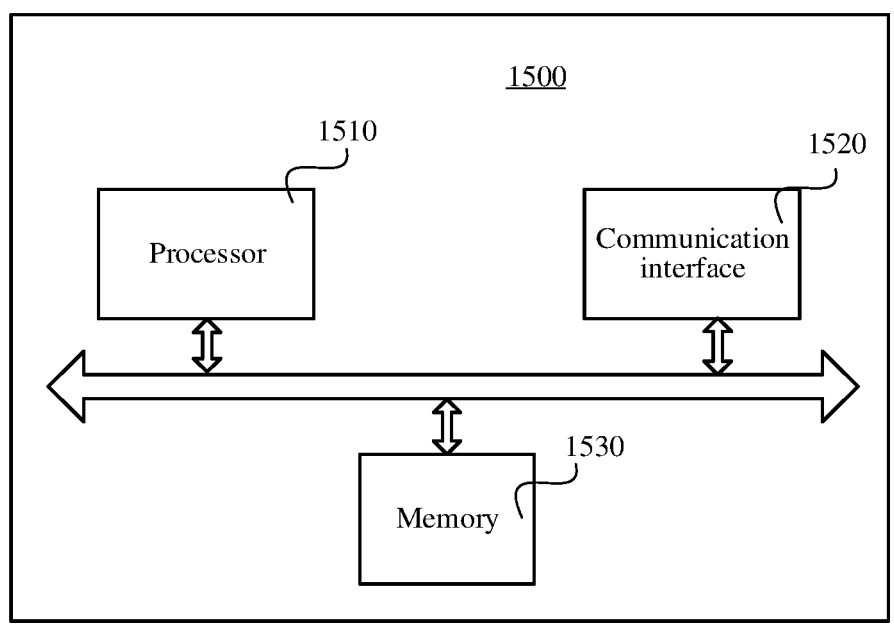
FIG. 15 is a schematic diagram of a structure of a communication apparatus according to an embodiment of this application.

The following describes in detail communication apparatuses provided in embodiments of this application with reference to FIG. 14 and FIG. 15. It should be understood that descriptions of apparatus embodiments correspond to the descriptions of the method embodiments. Therefore, for content that is not described in detail, refer to the foregoing method embodiments. For brevity, details are not described herein again.

The communication unit may also be referred to as a transceiver, a transceiver machine, a transceiver apparatus, or the like. The processing unit may also be referred to as a processor, a processing board, a processing module, a processing apparatus, or the like. Optionally, a component that is in the communication unit 1402 and that is configured to implement the receiving function may be considered as a receiving unit, and a component that is in the communication unit 1402 and that is configured to implement the sending function may be considered as a sending unit. That is, the communication unit 1402 includes the receiving unit and the sending unit. The communication unit sometimes may also be referred to as a transceiver machine, a transceiver, a transceiver circuit, or the like. The receiving unit may also be sometimes referred to as a receiver, a receiver machine, a receiver circuit, or the like. The sending unit sometimes may also be referred to as a transmitter, a transmitter machine, a transmitter circuit, or the like.

When the communication apparatus 1400 performs the functions of the terminal device in the procedure shown in FIG. 2 in the foregoing embodiments:

The communication unit is configured to receive configuration information from a network device. The configuration information indicates an occasion and/or a period for sending a measurement signal on a second uplink carrier.

The processing unit is configured to obtain signal quality or signal strength on a downlink carrier associated with a first uplink carrier, or signal quality or signal strength on a downlink resource on a first uplink carrier.

The communication unit is configured to: when a first condition is met, send the measurement signal on the second uplink carrier by occupying the occasion and/or the period; or when a first condition is not met, determine not to send the measurement signal on the second uplink carrier by occupying the occasion and/or the period, where the first condition includes: the signal quality or the signal strength is greater than or equal to a first threshold.

When the communication apparatus 1400 performs the function of the network device in the procedure shown in FIG. 2 in the foregoing embodiments:

The processing unit is configured to generate configuration information. The configuration information indicates an occasion and/or a period for sending a measurement signal on a second uplink carrier.

The communication unit is configured to: send the configuration information to a terminal device, and receive the measurement signal on the occasion and/or in the period on the second uplink carrier when a first condition is met.

The first condition includes: signal quality or signal strength on a downlink carrier associated with a first uplink carrier is greater than or equal to a first threshold, or signal quality or signal strength on a downlink resource on a first uplink carrier is greater than or equal to a first threshold.

When the communication apparatus 1400 performs the functions of the terminal device in the procedure shown in FIG. 4 in the foregoing embodiments:

The processing unit is configured to send, by using a communication unit, a scheduling request to a network device on a first resource or a second resource on a first uplink carrier. The scheduling request is used to request the network device to send scheduling information.

The processing unit is configured to: receive, by using the communication unit, first scheduling information from the network device when the scheduling request is sent on the first resource, where the first scheduling information indicates the terminal device to send a measurement signal on a second uplink carrier; or receive second scheduling information from the network device when the scheduling request is sent on the second resource, where the second scheduling information indicates, to the terminal device, a resource used to send data.

When the communication apparatus 1400 performs the function of the network device in the procedure shown in FIG. 4 in the foregoing embodiments:

The communication unit is configured to receive a scheduling request from a terminal device on a first uplink carrier. The scheduling request is used to request scheduling information.

The processing unit is configured to: when the scheduling request is received on a first resource, send first scheduling information to the terminal device by using the communication unit. The first scheduling information indicates the terminal device to send a measurement signal on a second uplink carrier.

Alternatively, the processing unit is configured to: when the scheduling request is received on a second resource, send second scheduling information to the terminal device by using the communication unit. The second scheduling information indicates, to the terminal device, a resource used to send data.

When the communication apparatus 1400 performs the functions of the terminal device in the procedure shown in FIG. 5 in the foregoing embodiments:

The processing unit is configured to receive first scheduling information by using a communication unit. The first scheduling information includes first information and second information, the first information indicates the terminal device to send a measurement signal on a second uplink carrier, and the second information indicates a resource used to send data on a first uplink carrier.

The processing unit is configured to send the measurement signal on the second uplink carrier by using the communication unit.

When the communication apparatus 1400 performs the function of the network device in the procedure shown in FIG. 5 in the foregoing embodiments:

The processing unit is configured to send first scheduling information by using a communication unit. The first scheduling information includes first information and second information, the first information indicates a terminal device to send a measurement signal on a second uplink carrier, and the second information indicates a resource used to send data on a first uplink carrier.

The processing unit is configured to receive the measurement signal on the second uplink carrier by using the communication unit.

When the communication apparatus 1400 performs the functions of the terminal device in the procedure shown in FIG. 6 in the foregoing embodiments:

The processing unit is configured to receive a first instruction from a network device by using a communication unit. The first instruction indicates a second uplink carrier that is capable of being used to send information or that is used to send information in K second uplink carriers.

The processing unit is configured to send a measurement signal on L second uplink carriers by using the communication unit. The L second uplink carriers each are a second uplink carrier in the K second uplink carriers that is different from the second uplink carrier that is capable of being used to send information or that is used to send information, L is an integer less than or equal to K, and K is an integer greater than 0.

When the communication apparatus 1400 performs the function of the network device in the procedure shown in FIG. 6 in the foregoing embodiments:

The processing unit is configured to send a first instruction to a terminal device by using a communication unit. The first instruction indicates a second uplink carrier that is capable of being used to send information or that is used to send information in K second uplink carriers.

The processing unit is configured to receive a measurement signal from the terminal device on L second uplink carriers by using the communication unit. The L second uplink carriers each are a second uplink carrier in the K second uplink carriers that is different from the second uplink carrier that is capable of being used to send information or that is used to send information, L is an integer less than or equal to K, and K is an integer greater than 0.

The foregoing is merely an example. The processing unit 1401 and the communication unit 1402 may further perform another function. For more detailed descriptions, refer to related descriptions in the method embodiments shown in FIG. 2 to FIG. 6. Details are not described herein again.

FIG. 15 shows an apparatus 1500 according to an embodiment of this application. The apparatus shown in FIG. 15 may be an implementation of a hardware circuit of the apparatus shown in FIG. 14. The communication apparatus is applicable to the foregoing flowcharts, and performs functions of the terminal device or the network device in the foregoing method embodiments. For ease of description, FIG. 15 shows only main components of the communication apparatus.

As shown in FIG. 15, the communication apparatus 1500 includes a processor 1510 and a communication interface 1520. The processor 1510 and the communication interface 1520 are coupled to each other. It may be understood that the communication interface 1520 may be a transceiver or an input/output interface. Optionally, the communication apparatus 1500 may further include a memory 1530, configured to: store instructions executed by the processor 1510, or store input data required by the processor 1510 to run the instructions, or store data generated after the processor 1510 runs the instructions.

When the communication apparatus 1500 is configured to implement the methods shown in FIG. 2 to FIG. 6, the processor 1510 is configured to implement a function of the processing unit 1401, and the communication interface 1520 is configured to implement a function of the communication unit 1402.

When the communication apparatus is a chip applied to a terminal device, the chip in the terminal device implements functions of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a chip applied to a network device, the chip in the network device implements functions of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

It may be understood that the processor in embodiments of this application may be a central processing unit (CPU), may be another general-purpose processor, a digital signal processor (DSP), an application-specific integrated circuit (ASIC), a field programmable gate array (FPGA), another programmable logic device, a transistor logic device, a hardware component, or any combination thereof. The general-purpose processor may be a microprocessor, any conventional processor, or the like.

In embodiments of this application, the processor may be a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or a storage medium in any other form well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a network device or a terminal device. Certainly, the processor and the storage medium may exist in the network device or the terminal device as discrete components.

A person skilled in the art should understand that embodiments of this application may be provided as a method, a system, or a computer program product. Therefore, this application may be in a form of a hardware-only embodiment, a software-only embodiment, or an embodiment with a combination of software and hardware. In addition, this application may be in a form of a computer program product that is implemented on one or more computer-usable storage media (including but not limited to a disk memory, an optical memory, and the like) that include computer-usable program code.

This application is described with reference to the flowcharts and/or the block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

The computer program instructions may alternatively be stored in a computer-readable memory that can guide a computer or another programmable data processing device to work in a specific manner, so that the instructions stored in the computer-readable memory generate an artifact that includes an instruction apparatus. The instruction apparatus implements a specified function in one or more procedures in the flowcharts and/or in one or more blocks in the block diagrams.

It is clearly that, a person skilled in the art can make various modifications and variations to this application without departing from the scope of this application. In this way, this application is intended to cover these modifications and variations of this application provided that they fall within the scope of the claims of this application and their equivalent technologies.

What is claimed is:

1. A communication method, comprising:
   receiving configuration information from a network device, wherein the configuration information indicates an occasion or a period for sending a measurement signal on a second uplink carrier;
   obtaining signal quality or signal strength on a downlink carrier associated with a first uplink carrier or on a downlink resource of the first uplink carrier; and
   in response to a first condition being met, sending the measurement signal on the second uplink carrier by occupying the occasion or the period; or
   in response to the first condition being not met, determining not to send the measurement signal on the second uplink carrier by occupying the occasion or the period, wherein the first condition comprises: the signal quality or the signal strength is greater than or equal to a first threshold.

2. The method according to claim 1, further comprising:
   sending feedback information to the network device, wherein the feedback information indicates an occasion or a period that is not used to send the measurement signal.

3. The method according to claim 1, wherein the second uplink carrier is a supplementary uplink carrier of the first uplink carrier.

4. The method according to claim 1, wherein the measurement signal is used to determine whether the second uplink carrier is used to send information or whether the second uplink carrier is capable of being used to send information.

5. The method according to claim 1, wherein the first condition further comprises: an amount of to-be-sent data is greater than or equal to a second threshold.

6. A communication method, comprising:
sending configuration information to a terminal device, wherein the configuration information indicates an occasion or a period for sending a measurement signal on a second uplink carrier; and
receiving the measurement signal on the occasion or in the period on the second uplink carrier in response to a first condition being met, wherein
the first condition comprises:
signal quality or signal strength on a downlink carrier associated with a first uplink carrier being greater than or equal to a first threshold; or
signal quality or signal strength on a downlink resource of the first uplink carrier being greater than or equal to the first threshold.

7. The method according to claim 6, further comprising:
receiving feedback information from the terminal device, wherein the feedback information indicates an occasion or a period that is not used to send the measurement signal.

8. The method according to claim 6, wherein the second uplink carrier is a supplementary uplink carrier of the first uplink carrier.

9. The method according to claim 6, wherein the measurement signal is used to determine whether the second uplink carrier is used to send information or whether the second uplink carrier is capable of being used to send information.

10. A communication apparatus, comprising:
a non-transitory memory storage comprising instructions; and
one or more processors in communication with the non-transitory memory storage, wherein the instructions, when executed by the one or more processors, cause the apparatus to:
receive configuration information from a network device, wherein the configuration information indicates an occasion or a period for sending a measurement signal on a second uplink carrier;
obtain signal quality or signal strength on a downlink carrier associated with a first uplink carrier or on a downlink resource of the first uplink carrier; and
in response to a first condition being met, sending the measurement signal on the second uplink carrier by occupying the occasion or the period; or
in response to the first condition being not met, determining not to send the measurement signal on the second uplink carrier by occupying the occasion or the period, wherein the first condition comprises: the signal quality or the signal strength is greater than or equal to a first threshold.

11. The communication apparatus according to claim 10, further comprising:
sending feedback information to the network device, wherein the feedback information indicates an occasion or a period that is not used to send the measurement signal.

12. The communication apparatus according to claim 10, wherein the second uplink carrier is a supplementary uplink carrier of the first uplink carrier.

13. The communication apparatus according to claim 10, wherein the measurement signal is used to determine whether the second uplink carrier is used to send information or whether the second uplink carrier is capable of being used to send information.

14. The communication apparatus according to claim 10, wherein the first condition further comprises: an amount of to-be-sent data is greater than or equal to a second threshold.

15. A communication apparatus, comprising:
a non-transitory memory storage comprising instructions; and
one or more processors in communication with the non-transitory memory storage, wherein the instructions, when executed by the one or more processors, cause the apparatus to:
send configuration information to a terminal device, wherein the configuration information indicates an occasion or a period for sending a measurement signal on a second uplink carrier; and
receive the measurement signal on the occasion or in the period on the second uplink carrier in response to a first condition being met, wherein the first condition comprises:
signal quality or signal strength on a downlink carrier associated with a first uplink carrier being greater than or equal to a first threshold; or
signal quality or signal strength on a downlink resource of the first uplink carrier being greater than or equal to the first threshold.

16. The communication apparatus according to claim 15, further comprising:
receiving feedback information from the terminal device, wherein the feedback information indicates an occasion or a period that is not used to send the measurement signal.

17. The communication apparatus according to claim 15, wherein the second uplink carrier is a supplementary uplink carrier of the first uplink carrier.

18. The communication apparatus according to claim 15, wherein the measurement signal is used to determine whether the second uplink carrier is used to send information or whether the second uplink carrier is capable of being used to send information.

* * * * *